(12) United States Patent
Roy et al.

(10) Patent No.: US 8,687,764 B2
(45) Date of Patent: Apr. 1, 2014

(54) ROBOTIC SENSOR

(76) Inventors: Uday S. Roy, Venetia, PA (US); Vishal Sheth, Lombard, IL (US); Prithwi S. Roy, Venetia, PA (US)

( * ) Notice: Subject to any disclaimer, the term of this patent is extended or adjusted under 35 U.S.C. 154(b) by 429 days.

(21) Appl. No.: 13/085,980

(22) Filed: Apr. 13, 2011

(65) Prior Publication Data

US 2011/0255663 A1 Oct. 20, 2011

Related U.S. Application Data

(60) Provisional application No. 61/324,272, filed on Apr. 14, 2010, provisional application No. 61/439,855, filed on Feb. 5, 2011.

(51) Int. Cl.
*G01N 23/04* (2006.01)

(52) U.S. Cl.
USPC .................................................. 378/57

(58) Field of Classification Search
USPC ............... 250/306, 308, 309, 358.1, 360.1; 378/57
See application file for complete search history.

(56) References Cited

U.S. PATENT DOCUMENTS

| | | |
|---|---|---|
| 3,158,744 A | 11/1964 | Bernstein |
| 3,543,952 A | 12/1970 | Young |
| 3,559,822 A | 2/1971 | Lichtenford et al. |
| 3,630,390 A | 12/1971 | Tax et al. |
| 3,812,987 A | 5/1974 | Watatani |
| 3,921,818 A | 11/1975 | Yamagishi |
| 4,244,615 A | 1/1981 | Brown |
| 4,400,650 A | 8/1983 | Giebeler, Jr. |
| 4,430,568 A | 2/1984 | Yoshida et al. |
| 4,599,740 A | 7/1986 | Cable |
| 4,726,046 A | 2/1988 | Nunan |
| 5,065,418 A | 11/1991 | Bermbach et al. |
| 5,089,972 A | 2/1992 | Nachman et al. |
| 5,098,640 A | 3/1992 | Gozani et al. |
| 5,111,494 A | 5/1992 | Turner et al. |
| 5,124,658 A | 6/1992 | Adler |

(Continued)

FOREIGN PATENT DOCUMENTS

CN 2354135 Y 12/1999
JP 200662765 A 3/2006

OTHER PUBLICATIONS

Wein et al., "Preventing the Importation of Illicit Nuclear Materials in Shipping Containers", Risk Analysis, 2006, pp. 1-52, vol. 26., No. 5.

(Continued)

*Primary Examiner* — Glen Kao
(74) *Attorney, Agent, or Firm* — The Webb Law Firm, P.C.

(57) ABSTRACT

A contraband detection system includes one or more detection devices operatively coupled to a spreader beam of a cargo container crane system. Detection devices may include an X-ray scanner, a detection apparatus, and a sensor array. The X-ray scanner is operative for outputting high-energy X-rays capable of penetrating through the contents of the cargo container. The X-ray scanner is movable from an inactive first position that facilitates engagement of the spreader beam with the cargo container to an active second position that facilitates the scanning of the contents of the cargo container. The detection apparatus is similarly deployable from a first position to a second position and includes a plurality of limbs capable of rotation about a plurality of axes. The detection apparatus further includes a radiation source and a receptor plate.

19 Claims, 19 Drawing Sheets

(56) References Cited

U.S. PATENT DOCUMENTS

| | | |
|---|---|---|
| 5,251,240 A | 10/1993 | Grodzins |
| 5,251,768 A | 10/1993 | Yoshimatsu et al. |
| 5,422,926 A | 6/1995 | Smith et al. |
| 5,495,106 A | 2/1996 | Mastny |
| 5,524,133 A | 6/1996 | Neale et al. |
| 5,638,420 A | 6/1997 | Armistead |
| 5,764,683 A | 6/1998 | Swift et al. |
| 5,838,759 A | 11/1998 | Armistead |
| 6,058,158 A | 5/2000 | Eiler |
| 6,370,222 B1 | 4/2002 | Cornick, Jr. |
| 6,936,820 B2 | 8/2005 | Peoples |
| 7,116,235 B2 | 10/2006 | Alioto et al. |
| 7,142,109 B1 | 11/2006 | Frank |
| 7,216,548 B2 | 5/2007 | Kurita et al. |
| 7,317,782 B2 | 1/2008 | Bjorkholm |
| 7,612,338 B2 | 11/2009 | Alioto et al. |
| 7,808,381 B2 | 10/2010 | Murphy et al. |
| 2010/0303287 A1* | 12/2010 | Morton .................. 382/100 |

OTHER PUBLICATIONS

Chen et al., "Dual-energy X-ray radiography for automatic high-Z material detection", Nucl. Instr. and Meth. in Phys. Res., 2007, pp. 356-359, vol. 261.

Auslender, "5-10 MEV Industrial High Power Electron Accelerators", Proceedings of LINAC2002, pp. 284-288, Gyeongju, Korea, (2002).

\* cited by examiner

ROBOTIC SENSOR

CROSS REFERENCE TO RELATED APPLICATIONS

This application claims priority to U.S. Provisional Patent Application No. 61/324,272, filed Apr. 14, 2010, entitled "Static Robotic Sensor" and U.S. Provisional Patent Application No. 61/439,855, filed Feb. 5, 2011, entitled "Twin Robot Attachment to a Container Transferring Mechanism (Crane or Gantry System) in Order to Perform Active Detection of Contrabands". The entire disclosure of these applications is incorporated by reference herein.

BACKGROUND OF THE INVENTION

1. Field of the Invention

The present invention relates to a method and apparatus for detecting contraband materials. More specifically, the present invention relates to a method and apparatus for non-destructive testing of objects for the purpose of detecting contraband materials.

2. Description of the Related Art

Current attempts at providing devices and methods for detecting contraband materials stored inside objects such as vehicles, luggage, or cargo containers have resulted in the development of technology that is inadequate to reliably screen a large number of such objects while maintaining high sensitivity for the detection of contraband materials. Existing screening techniques for detection of contraband materials are subject to a number of inefficiencies that decrease the reliability of the screening process and increase the possibility of contraband materials advancing undetected past a security checkpoint.

There exists no simple way to detect and deter the threat of contraband materials contained within vehicles, luggage, or cargo shipping containers. In order to assure that no contraband materials advance past a security checkpoint, each object must be screened for the presence of contraband materials. Various technologies have been developed for detecting a multitude of different contraband materials, including chemical, biological, radiological, nuclear, explosive, and narcotics materials. The procedure of scanning every object at a security checkpoint is effective in reliably screening for a variety of contraband materials; however, existing screening limitations prohibitively increase inspection costs and slow down the inspection process.

In order to screen objects for contraband materials in a cost-effective and time-efficient manner, generally only a portion of the objects passing through security checkpoints are examined. Inherent technological limitations in terms of size and/or volume of objects that can be screened are the main cause for the flaws in existing screening systems and methods. Considering the large volume of objects passing every day through various security checkpoints, and various locations, including border entry points, busy airports, and commercial and government buildings, remain vulnerable against the possibility of contraband materials passing undetected. Most objects passing through such locations are not checked for the presence of contraband materials, including explosives, biological, chemical, nuclear, or other destructive elements or devices.

One of the most common methods of screening objects for the presence of contraband materials involves the use of handheld devices. Such devices are generally used by security personnel to screen limited areas of vehicles, luggage, or cargo containers. These handheld devices are of limited use because they cannot be used to scan the entire area inside and outside vehicles, luggage, or cargo containers. Other screening methods involve visual inspections wherein security personnel visually inspect the object for the presence of contraband materials. Visual inspection may be further aided by the use of specially-trained dogs or handheld equipment having one or more sensors for detecting various contraband materials. One of the main disadvantages of these methods is that they are of very limited use when a large number of objects must be screened.

Various devices and methods for contraband detection may utilize X-ray technology to scan the interior of objects, such as vehicles, luggage, or cargo containers. Typically, these devices and methods utilize passive detection technology or active X-ray technology. In passive detection devices, no source of X-ray or gamma ray is projected towards the object. Passive detection devices are capable of detecting radiation emanating from radiological material such as uranium or plutonium concealed inside an object by detecting radiation emitted from such material. Despite their widespread use, passive detection devices are associated with the problem of unreliable detection. Passive detectors are commonly known to provide false detections from ordinary materials, such as ceramics, which are known to emit slight radiation.

In active X-ray devices, a source projects X-ray or gamma ray radiation which passes through an object. The radiation is detected by an array of detectors located on the opposing side of the object. Detectors measure the change in radiation and determine the presence of contraband materials concealed inside the object based on the change of radiation characteristics. Active X-ray devices are complex and require large radiation sources and detector arrays for scanning large objects, such as vehicles and cargo containers.

While conventional X-ray technology speeds up the inspection process by not requiring that each object be opened and visually inspected, it is associated with a number of disadvantages. Existing devices that utilize passive screening technology are susceptible to generating false alarms. Additionally, they are of limited use when radiological or nuclear material is concealed inside thick shields which do not allow the passage of X-rays. Although powerful active X-ray devices capable of generating X-rays which penetrate through thick materials, such as vehicles or shipping containers, exist in the prior art, these devices are prohibitively large and heavy to be used in any setting that is not in a fixed location on the ground. Additionally, they present a radiation exposure hazard to personnel surrounding such devices.

There exist various devices and methods for ground-based inspection of objects for the presence of contraband materials. U.S. Pat. No. 5,065,418 to Bermbach et al. suggests an apparatus for inspecting containers or vehicles at airports for illegal contents. Similarly, U.S. Pat. No. 5,764,683 to Swift et al. and U.S. Pat. No. 5,638,420 to Armistead disclose devices for inspecting objects, such as motor vehicles or freight pallets, wherein the device has a movable frame which can straddle the object being inspected. These approaches suggest a secondary operation that must be performed on the ground, thereby increasing the inefficiencies of the port's operations. U.S. Pat. No. 7,216,548 to Kurita et al. suggests improvements for the straddle-based inspection device with the incorporation of a position control system which helps to position the inspection device at the container location; however, such a device does not address the main concern of having a secondary operation that must be performed while the container is on the ground.

U.S. Pat. No. 6,058,158 to Eiler discloses an X-ray examination device for checking the contents of closed cargo carriers having two steerable single-track carriages disposed parallel to each other. One or more screened vehicles having leaded mesh screens for surrounding the cargo containers are provided to shield against harmful X-rays outside the cargo container area. The vehicle described in this patent is elaborate and large and cannot be mounted on a moving device, such as a shipyard crane. Additionally, the invention will extend the handling time and the space required to perform such secondary inspection operations. Similarly, U.S. Pat. No. 5,838,759 to Armistead describes an inspection system for detecting contraband in cargo containers, vehicles, rail cars, etc. having an X-ray source and X-ray imaging capability. This is another device for secondary inspection requiring large specialized equipment. U.S. Pat. No. 7,317,782 B2 to Bjorkholm suggests mounting of fixed X-ray radiographic devices on a crane's fixed structure, assuming the crane will lower the container between the X-ray beam source and the receptor, allowing the system to capture the radiographic image of the container. A disadvantage of this invention is that by forcing the container to be transported to a fixed X-ray scanning location, it inevitably slows down the operation of the security checkpoint. Additionally, the limited time an object spends inside the scanning location may be inadequate for producing a detailed radiographic image of the object. An additional disadvantage of many of the above-described prior art inventions is that they expose operators to dangerous X-rays while objects are being inspected.

The above-described prior art devices require a secondary procedure that is implemented in addition to the existing procedures at a security checkpoint. Therefore, the addition of a secondary procedure necessarily increases the processing time for each object that is inspected. In common security checkpoint operations, such as vehicles moving past a border entry point or cargo containers being unloaded from a shipping vessel, screening operations must be optimized to provide the most time-efficient procedure that produces reliable results. In a shipyard setting where thousands of cargo containers may be unloaded from ships, each second of cargo container processing time must be maximized to reduce inefficiencies. Arguably, the best moment for screening each cargo container is while it is being loaded or unloaded from a vessel by a bay-side crane. During this process, the container is locked to the crane's hoist mechanism and is carried from the vessel to the shore or vice-versa. Generally, it takes about 60 to 120 seconds to complete this process. During this time, the crane's hoist mechanism remains in contact with the cargo container and provides a great opportunity to screen the cargo while it is in transit. However, the prevailing detection technologies remain land-based because of the above-described limitations.

Prior art radiation measurement/detection technologies for detection of contraband materials are not amenable for use on a crane and its hoist mechanism. Due to the complexity involved in applying and adapting active X-ray sensing technology on a shipyard crane, prior art systems rely on passive detection methods. However, passive and sniffer type detectors are unreliable and are known for producing false alarms. U.S. Pat. No. 6,936,820 B2 to Peoples describes a cargo container inspection device that uses passive radiological detectors for inspection of conventional cargo containers. U.S. Pat. No. 7,116,235 B2 to Alioto et al. suggests a method for comparing the gamma ray and neutron data measured by passive detectors with the expected gamma ray and neutron count of radiological or nuclear contraband materials to determine the presence of radiological substances hidden in a cargo container. U.S. Pat. No. 7,142,109 B1 to Frank suggests an elaborate arrangement to improve the measurement performance of the passive and sniffer type sensors. However, all of the above-described devices and methods fail to provide a solution that would provide reliable detection. U.S. Pat. No. 7,808,381 B2 to Murphy et al. describes a system and method for screening inter-modal shipping containers for the presence of certain weapons. All of the above-described prior art devices and methods are associated with a number of disadvantages which do not enable their application on conventional crane systems. Additionally, the size and weight of active X-ray devices necessary for scanning large objects, such as vehicles and containers, require fixed, ground-based locations.

Accordingly, there exists a need for a method and apparatus for non-destructive testing of objects for the purpose of detecting a plurality of contraband materials which overcome the problems associated with the prior art. Additionally, there exists a need for a method and apparatus for non-destructive testing of objects that increases the efficiency of current contraband screening processes and decreases the potential for false alarms. Furthermore, an additional need exists in the art for a method and apparatus for non-destructive testing of objects which is easily adapted for use with existing devices used at a security checkpoint without requiring additional processes or steps in the screening process.

SUMMARY OF THE INVENTION

These and other features and characteristics of the present invention, as well as the methods of operation and functions of the related elements of constructions and the combination of parts and economies of manufacture will become more apparent upon consideration of the following description with reference to the accompanying drawings, all of which form a part of this specification, wherein like reference numerals designate corresponding parts in the various figures.

According to an embodiment of the present invention, a contraband detection system for screening an object for the presence of contraband materials may include a first detection apparatus having a first radiation source and a first radiation detector and a second detection apparatus having a second radiation source and a second radiation detector. The second detection apparatus may be desirably disposed opposite the first detection apparatus such that the object to be screened for the presence of contraband materials is located between the first detection apparatus and the second detection apparatus. A controller may be provided for operating the first detection apparatus and the second detection apparatus. Additionally, a data analysis computer operative for receiving signals from the first detection apparatus and the second detection apparatus may also be provided.

The first radiation source may emit a first radiation beam that is received by the second radiation detector after passing through the object to generate a first signal commensurate with radiation detected by the second radiation detector. Similarly, the second radiation source may emit a second radiation beam that is received by the first radiation detector after passing through the object to generate a second signal commensurate with radiation detected by the first radiation detector. In accordance with one embodiment of the present invention, the data analysis computer may receive the first signal and the second signal and analyze the signals to determine whether the object contains contraband materials.

According to another embodiment of the present invention, each of the first detection apparatus and the second detection apparatus may further include a plurality of limbs operative for rotating about a plurality of rotation axes. The plurality of limbs may be capable of being articulated to a plurality of positions about the object to screen the object for the presence of contraband materials. According to another embodiment of the present invention, the plurality of limbs may be capable of being articulated to a first, fully-retracted position, a second, fully-extended position, and a plurality of intermediate positions between the first position and the second position. The controller may synchronize the operation of the plurality of limbs of the first detection apparatus and the plurality of limbs of the second detection apparatus such that one of the first detection apparatus or the second detection apparatus is a master and the other of the first detection apparatus or the second detection apparatus is a slave.

According to a further embodiment of the present invention, the contraband detection system may further include an X-ray scanner deployable between a first, inactive position and a second, active position. Optionally, the contraband detection system may also include a sensor array having a plurality of sensors for detecting contraband materials.

In accordance with yet another embodiment of the present invention, a contraband detection system for detecting the presence of contraband materials in a cargo container hoisted by a crane system may include a crane system having a spreader beam and/or a head block operative for engaging the cargo container and hoisting the cargo container from a first location to a second location. A first detection apparatus may be located on one end of the spreader beam, the first detection apparatus having a first radiation source and a first radiation detector. A second detection apparatus may be located on an opposing end of the spreader beam, the second detection apparatus having a second radiation source and a second radiation detector. The second detection apparatus may be disposed opposite the first detection apparatus such that the cargo container to be screened for the presence of contraband materials is located between the first detection apparatus and the second detection apparatus. A controller may be provided for operating the first detection apparatus and the second detection apparatus. Additionally, a data analysis computer operative for receiving signals from the first detection apparatus and the second detection apparatus may also be provided.

According to another embodiment of the present invention, the first radiation source may emit a first radiation beam that is received by the second radiation detector after passing through the cargo container to generate a first signal commensurate with radiation detected by the second radiation detector. Similarly, the second radiation source may emit a second radiation beam that is received by the first radiation detector after passing through the cargo container to generate a second signal commensurate with radiation detected by the first radiation detector. The data analysis computer may receive the first signal and the second signal and analyze the signals to determine whether the cargo container contains contraband materials.

According to another embodiment of the present invention, the contraband detection system may further include an upper limb rotatable about its first end with respect to the spreader beam, the upper limb being rotatable about a first axis. A middle limb having its first end coupled to a second end of the upper limb may also be provided, the middle limb being rotatable about a second axis. Additionally, a lower limb having its first end coupled to a second end of the middle limb may further be provided, the lower limb being rotatable about a third axis. The limbs may be operative for articulating to a first position to facilitate engagement of the spreader beam to the cargo container and a second position for screening the cargo container once the spreader beam is engaged to the cargo container. In the second position, the limbs may be capable of being articulated to a plurality of positions adjacent to a side of the cargo container to screen the cargo container for the presence of contraband materials. The controller may synchronize the operation of the limbs of the first detection apparatus and the limbs of the second detection apparatus such that one of the first detection apparatus or the second detection apparatus is a master and the other of the first detection apparatus or the second detection apparatus is a slave.

According to another embodiment of the present invention, the first and second radiation sources may be disposed on the middle limbs of the first and second detection apparatus, respectively, and the first and second radiation detectors may be disposed on the lower limbs of the first and second detection apparatus, respectively. Each of the limbs may be rotatable about its respective axis by a stepper motor controlled by the controller.

According to another aspect of the present invention, the contraband detection system may further include an X-ray scanner deployable between a first, inactive position and a second, active position. Additionally, a sensor array having a plurality of sensors for detecting contraband materials may be provided.

In accordance with another embodiment of the present invention, a method for detecting contraband materials may include the steps of: (a) providing a crane system having a spreader beam and/or head block operative for engaging a cargo container and hoisting the cargo container from a first location to a second location and (b) providing a contraband detection system on the crane system for detecting the presence of contraband materials in the cargo container, the contraband detection system having a first detection apparatus and a second detection apparatus. The method may further include the steps of (c) locating the first detection apparatus on one end of the spreader beam, the first detection apparatus having a first radiation source and a first radiation detector and (d) locating the second detection apparatus on an opposing end of the spreader beam, the second detection apparatus having a second radiation source and a second radiation detector. The second detection apparatus may be disposed opposite the first detection apparatus such that the cargo container to be screened for the presence of contraband materials is located between the first detection apparatus and the second detection apparatus. The method may further include the steps of (e) identifying the cargo container to be screened for the presence of contraband materials and (f) controlling the operating of the first detection apparatus and the second detection apparatus to screen the cargo container. Additionally, the method may also include the steps of (g) receiving signals generated by the first detection apparatus and the second detection apparatus and (h) analyzing the received signals to determine whether the cargo container contains contraband materials. The method may additionally include the step of (i) generating a single radiographic image of the cargo container compiled from multiple radiographic images of portions of the cargo container obtained from signals generated by the first detection apparatus and the second detection apparatus. The single radiographic image may be indicative of whether the cargo container contains contraband materials.

DETAILED DESCRIPTION OF THE INVENTION

Figure 1:
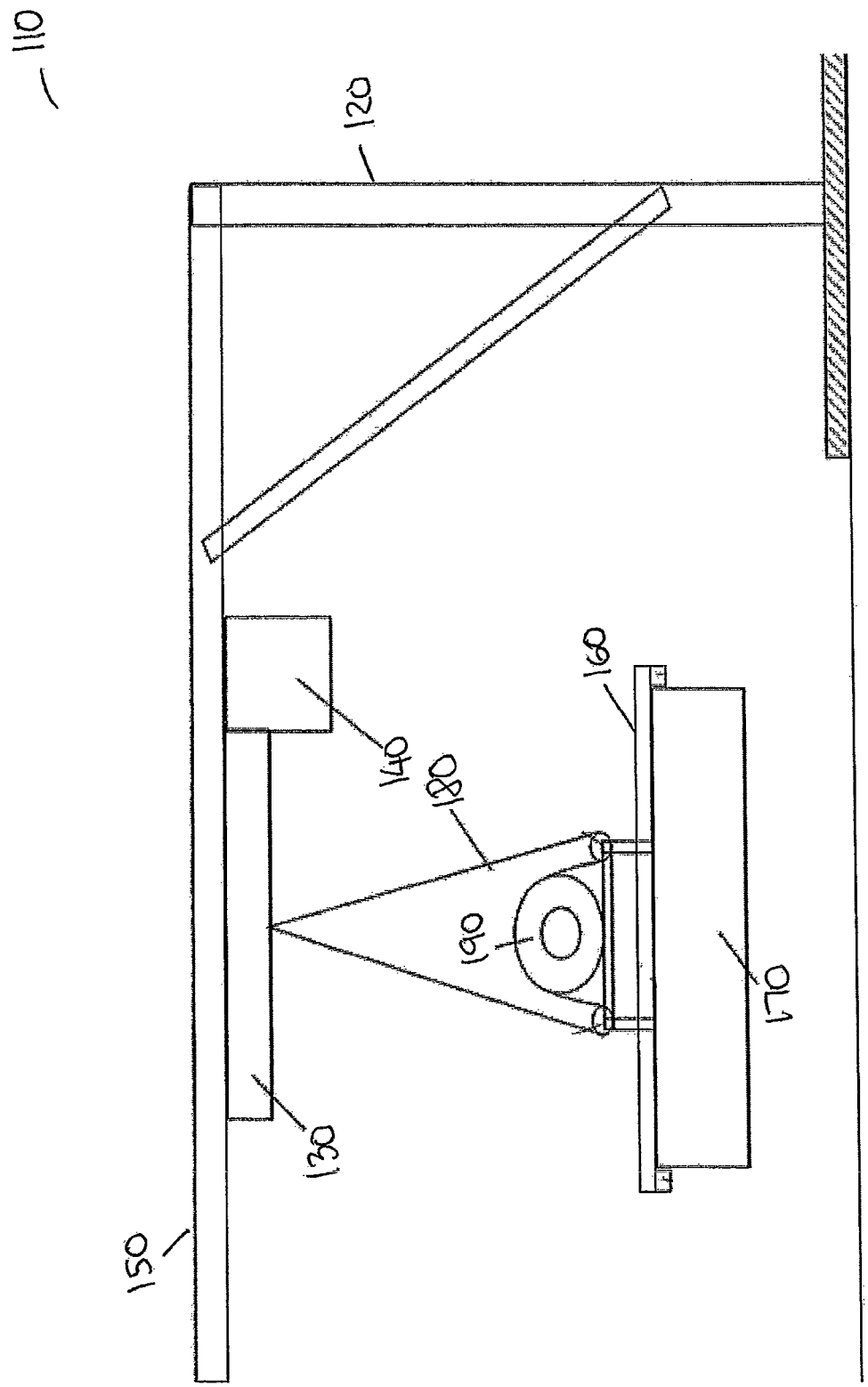
FIG. 1 shows a crane system suitable for lifting cargo containers.

For purposes of the description hereafter, spatial and directional terms shall relate to the invention as it is oriented in the drawing figures. However, it is to be understood that the invention may assume various alternative variations, expect where expressly specified to the contrary. It is also to be understood that the specific components illustrated in the attached drawings, and described in the following specification, are simply exemplary embodiments of the invention. Hence specific dimensions and other physical characteristics related to the embodiments disclosed herein are not to be considered as limiting.

Referring to the drawings in which like reference characters refer to like parts throughout the several views thereof, the present invention is generally described in terms of a method and apparatus for non-destructive testing of objects for the purpose of detecting a plurality of contraband materials. The apparatus and method are operative for improving the operating efficiency of the inspection process at a security checkpoint.

According to one embodiment of the present invention, a contraband detection system 100 is applied to a conventional crane assembly used to move cargo containers to and from ships. One of ordinary skill in the art will understand that contraband detection system 100 is not limited to this specific embodiment, but can be applied in a plurality of settings where screening for contraband materials is desired. For example, in alternate embodiments, contraband detection system 100 may be utilized to screen vehicles, luggage, and other objects for presence of various contraband materials. Examples of such embodiments will be described hereinafter.

With reference to FIG. 1, a crane system 110 includes a main structure 120 that supports a trolley 130 and operator cabin 140. Trolley 130 and operator cabin 140 are movable along a crane boom 150. In some embodiments, operator cabin 140 may be fixed on main structure 120 while trolley 130 is movable along crane boom 150. Operator cabin 140 contains controls for controlling the operation of crane system 110, including the movement of trolley 130 along crane boom 150.

With continuing reference to FIG. 1, crane system 110 further includes a spreader beam 160 adapted for engaging a cargo container 170. Spreader beam 160 is vertically suspended from trolley 130 by cable 180. Spreader beam 160 is movable in a vertical direction by winding or unwinding cable 180 from cable drum 190. Spreader beam 160 has a generally rectangular shape dimensioned to engage a conventional cargo container 170. Typically, cargo container 170 is a metal enclosure defining an interior volume capable of containing a plurality of objects. Cargo container 170 may have standardized dimensions, such as 50' length, 10' height, and 10' width. Other cargo container 170 dimensions are also possible. Various attachment means (not shown) may be utilized to engage spreader beam 160 to cargo container 170 for the purpose of lifting and moving cargo container 170 from one location to another.

Figure 2:
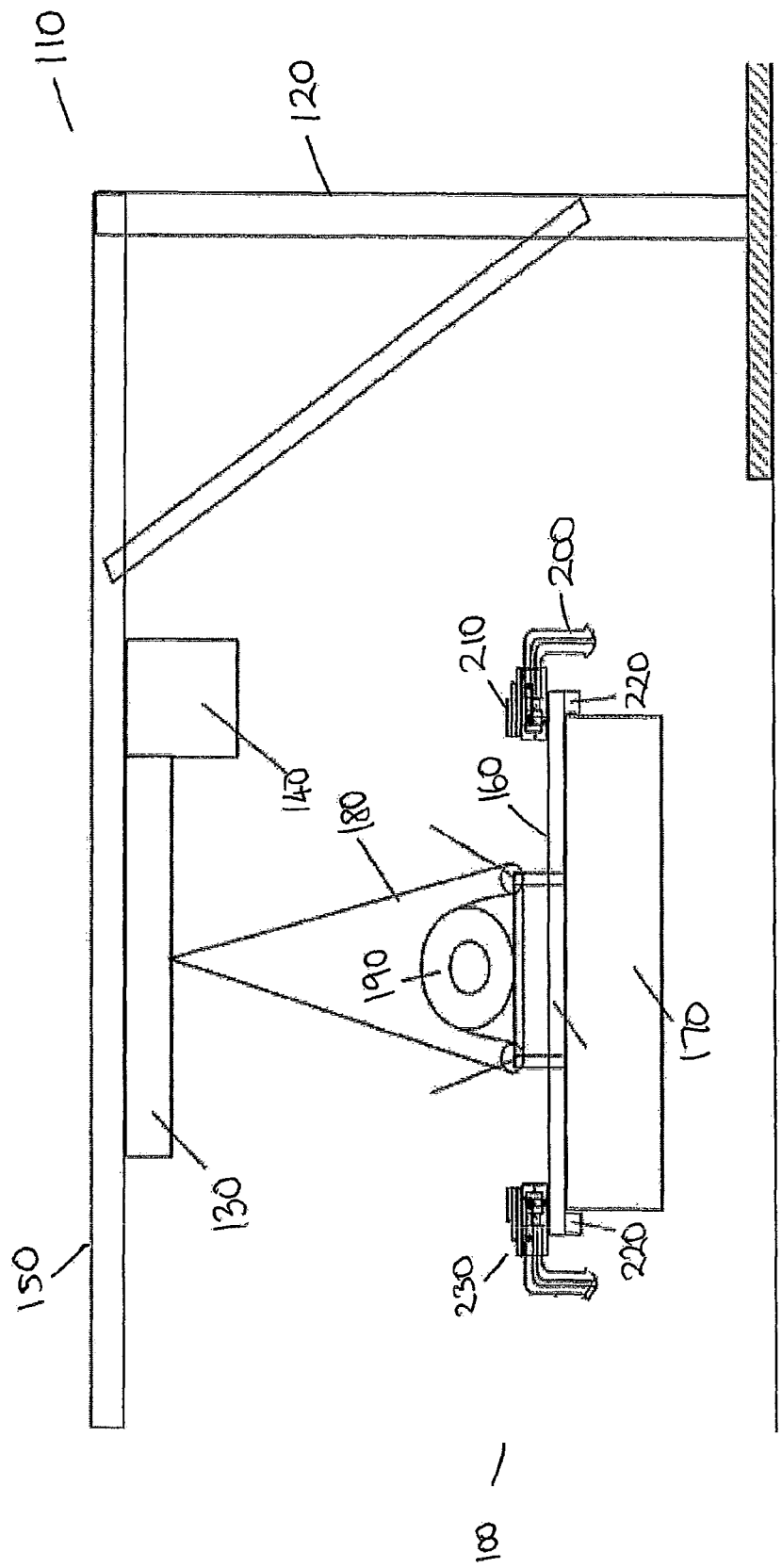
FIG. 2 is a side view of the crane system of FIG. 1 adapted for use with a contraband detection system in accordance with one embodiment of the present invention.

With reference to FIG. 2, and continuing reference to FIG. 1, crane system 110 supports contraband detection system 100. As shown in FIG. 2, contraband detection system 100 is installed on spreader beam 160; however, other locations on crane system 110 where contraband detection system 100 may be installed, such as the head block of the crane (not shown), are not precluded. Contraband detection system 100 has a plurality of detection devices, including an X-ray scanner 200, detection apparatus 210, and sensor array 220. One of ordinary skill in the art will understand that contraband detection system 100 may include one or more of the above detection devices. Additionally, other known detection devices may be combined with contraband detection system 100 without departing from the intended scope of the invention.

Figure 3:
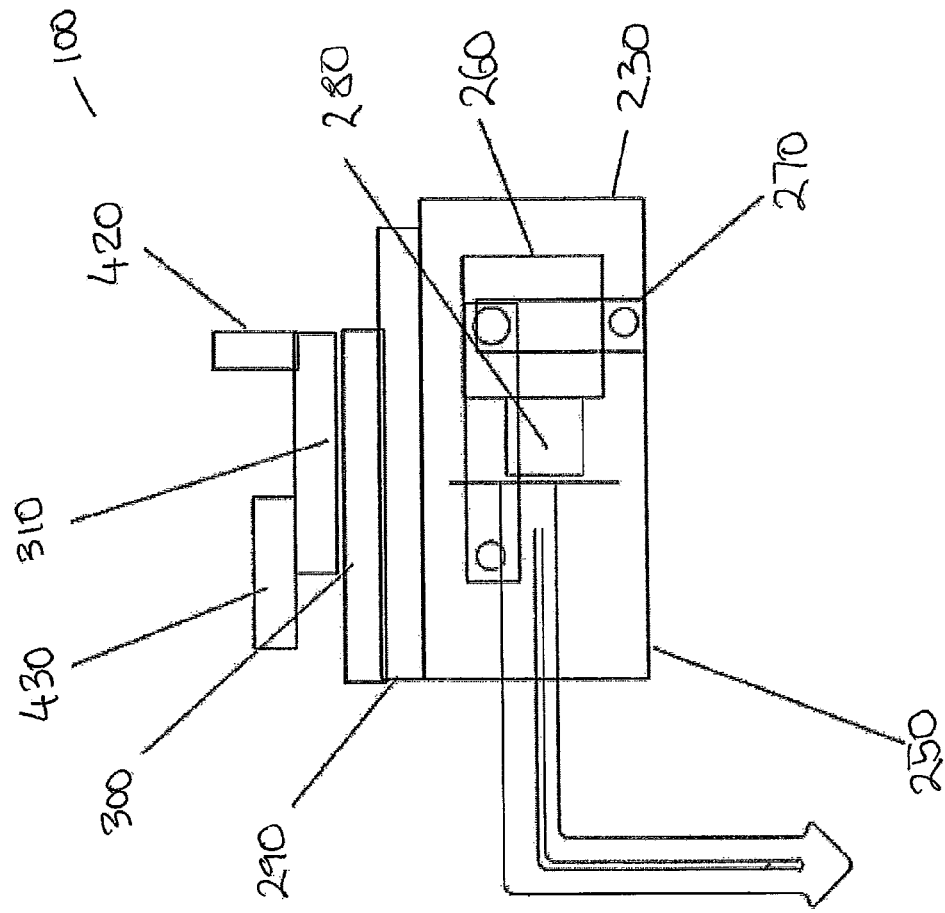
FIG. 3 is a side view of the contraband detection system shown in an inactive first position.
Figure 4:
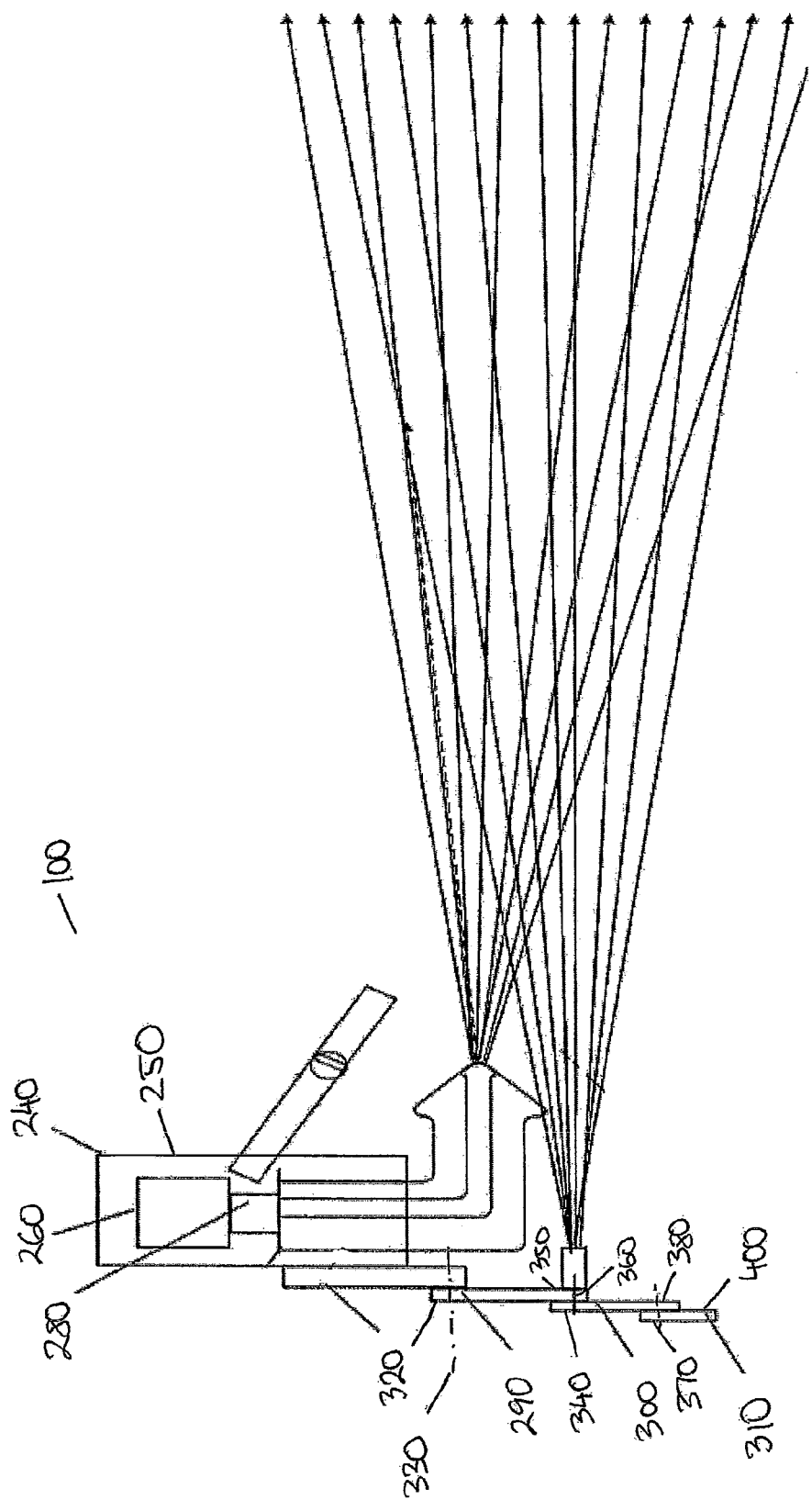
FIG. 4 is a side view of the contraband detection system shown in an active second position.

With reference to FIGS. 3 and 4, and with continuing reference to FIG. 2, X-ray scanner 200 is a radiographic device capable of outputting high-power X-ray beams. As shown in FIG. 2, two X-ray scanners 200 are installed on opposing longitudinal ends of spreader beam 160. In alternate embodiments, only one X-ray scanner 200 may be utilized. For example, X-ray scanner 200 may be a linear particle accelerator (LINAC) unit capable of generating high-power X-ray beams capable of penetrating through the construction of cargo container 170. Typically, such LINAC units generate X-ray beams having intensity in excess of 3 MeV. The X-ray beam produced by the LINAC unit may also alternate in intensity between a lower MeV strength (around 3-6 MeV level) and higher energy level (around 7-10 MeV level) in order to create dual energy level signature of any material contained in cargo container 170.

With continuing reference to FIGS. 2-4, X-ray scanner 200 may be movable with respect to spreader beam 160 between a first position 230 (as shown in FIG. 3) and a second position 240 (as shown in FIG. 4). In one desirable embodiment, first position 230 of X-ray scanner 200 represents an inactive position where X-ray scanner 200 is stowed away to facilitate movement of spreader beam 160 to and from cargo container 170. In first position 230, X-ray scanner 200 is not powered on. FIG. 4 illustrates X-ray scanner 200 in an active position where X-ray scanner 200 is deployed to a scanning position on spreader beam 160 to scan the contents of cargo container 170. In second position 240, X-ray scanner 200 may be powered on for scanning the contents of cargo container 170.

With continuing reference to FIGS. 3 and 4, X-ray scanner 200 includes an outer shell 250 that encloses the LINAC unit and various components that cause the movement of X-ray scanner 200 between first position 230 and second position 240. For example, motor 260 drives a gear mechanism 270 which is utilized to move X-ray scanner 200 from first position 230 to second position 240. Other devices, including mechanical, electrical, hydraulic, pneumatic, and combinations thereof, may be utilized to cause the motion of X-ray scanner 200 from first position 230 to second position 240. X-ray scanner 200 may be movable in a vertical direction with respect to cargo container 170 once X-ray scanner 200 is deployed to second position 240 via a vertical adjustment mechanism 280. In an embodiment where two X-ray scanners 200 are utilized on opposing ends of spreader beam 160, each X-ray scanner 200 may have a vertical adjustment mechanism 280. In such an embodiment, both vertical adjustment mechanisms 280 may be controlled for synchronized movement in the vertical direction with respect to cargo container 170. In embodiments that utilize vertical adjustment mechanism 280, X-ray scanner 200 is moved up and down with respect to cargo container 170 to scan the entire side of cargo container 170.

Figure 5:
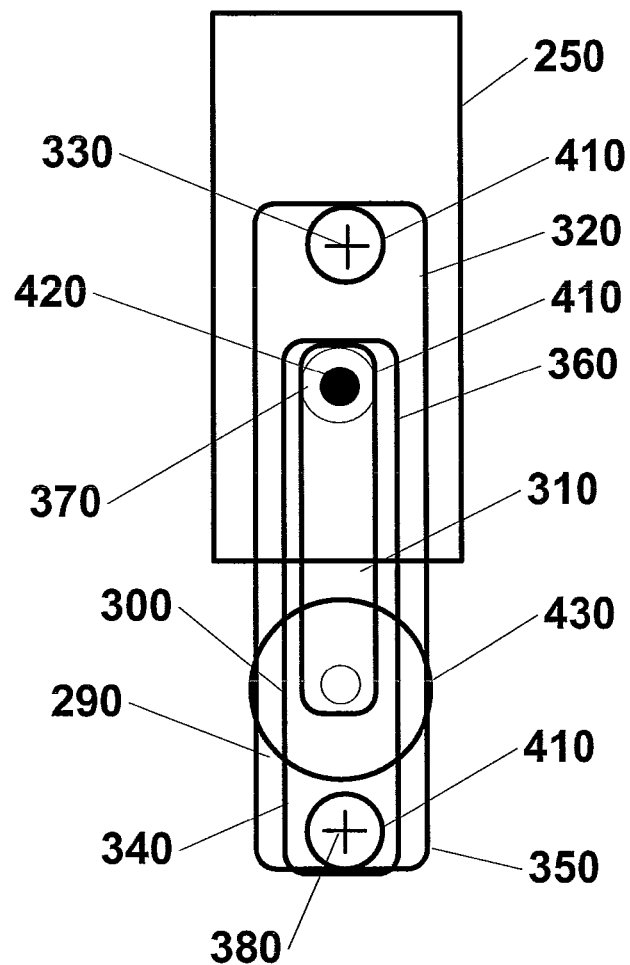
FIG. 5 is a front view of a detection apparatus of contraband detection system in a retracted state.

With reference to FIGS. 4 and 5, contraband detection system 100 further includes detection apparatus 210. In FIGS. 4 and 5, detection apparatus 210 is illustrated as being mounted to outer shell 250 of X-ray scanner 200. One of ordinary skill in the art will understand that other alternate mounting locations for detection apparatus 210 are also possible. Two detection apparatus 210 are installed on opposing longitudinal ends of spreader beam 160. Each detection apparatus 210 is movable between first position 230 and second position 240 along with X-ray scanners 200. In one desirable embodiment, first position 230 of detection apparatus 210 represents an inactive position where detection apparatus 210 is stowed away to facilitate movement of spreader beam 160 to and from cargo container 170. In first position 230, detection apparatus 210 is not powered on. FIG. 4 illustrates detection apparatus 210 in an active position where detection apparatus 210 is deployed to a scanning position on spreader beam 160 to scan the contents of cargo container 170. In second position 240, detection apparatus 210 may be powered on for scanning the contents of cargo container 170.

Each detection apparatus 210 has a plurality of limbs capable of rotation about a plurality of rotation axes. In one desirable embodiment illustrated in FIG. 4, detection apparatus 210 includes an upper limb 290, a middle limb 300, and a lower limb 310. A first end 320 of upper limb 290 is rotatably attached to outer shell 250 of X-ray scanner 200 and is rotatable about first axis 330. In alternate embodiments, first end 320 of upper limb 290 may be rotatably coupled directly to spreader beam 160. A first end 340 of middle limb 300 rotatably attaches to second end 350 of upper limb 290 and is rotatable about second axis 360. Similarly, first end 370 of lower limb 310 is rotatably attached to second end 380 of middle limb 300 and is rotatable about third axis 390. Upper limb 290 is dimensioned to be longer in length than middle limb 300, which is yet longer in length than lower limb 310.

Figure 6:
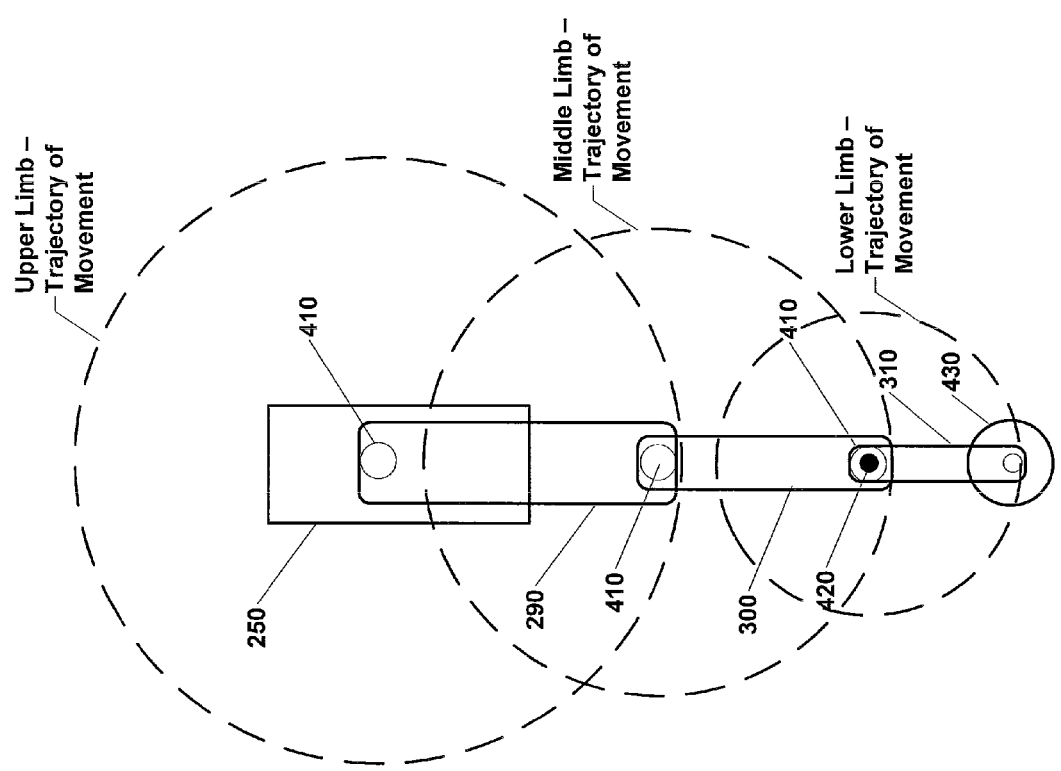
FIG. 6 is a front view of the detection apparatus of the contraband detection system in an extended state.
Figure 7:
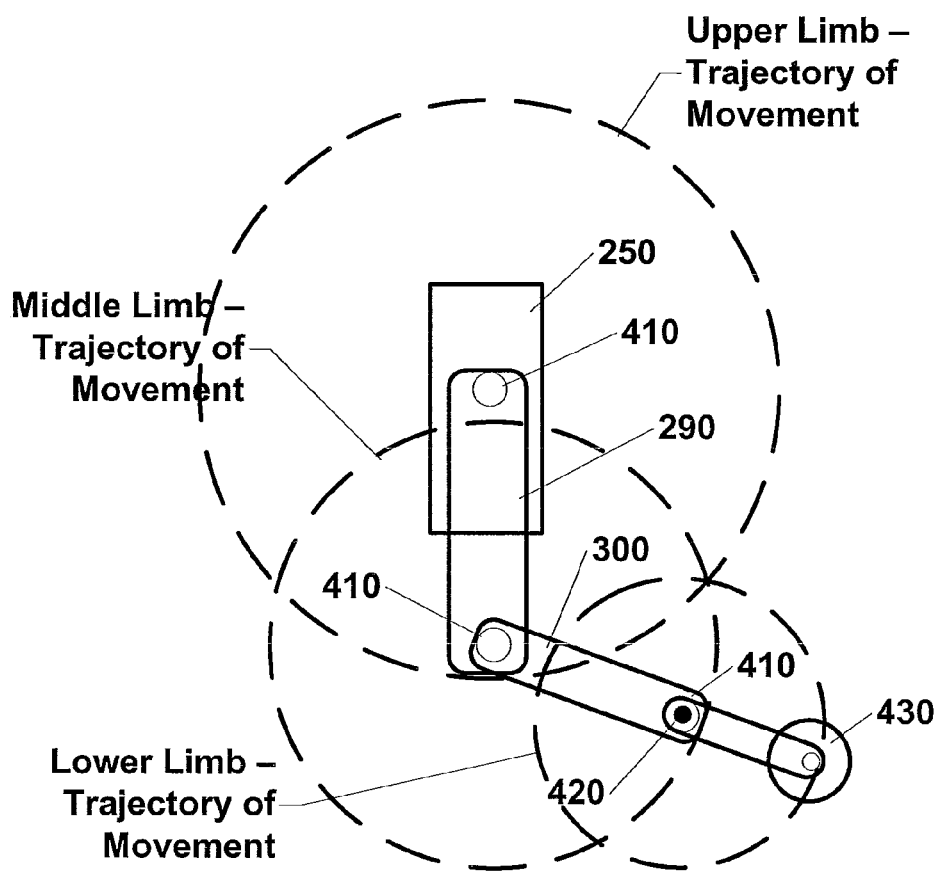
FIGS. 7-9 are front views of detection apparatus of the contraband detection system shown in various alternate orientations.
Figure 8:
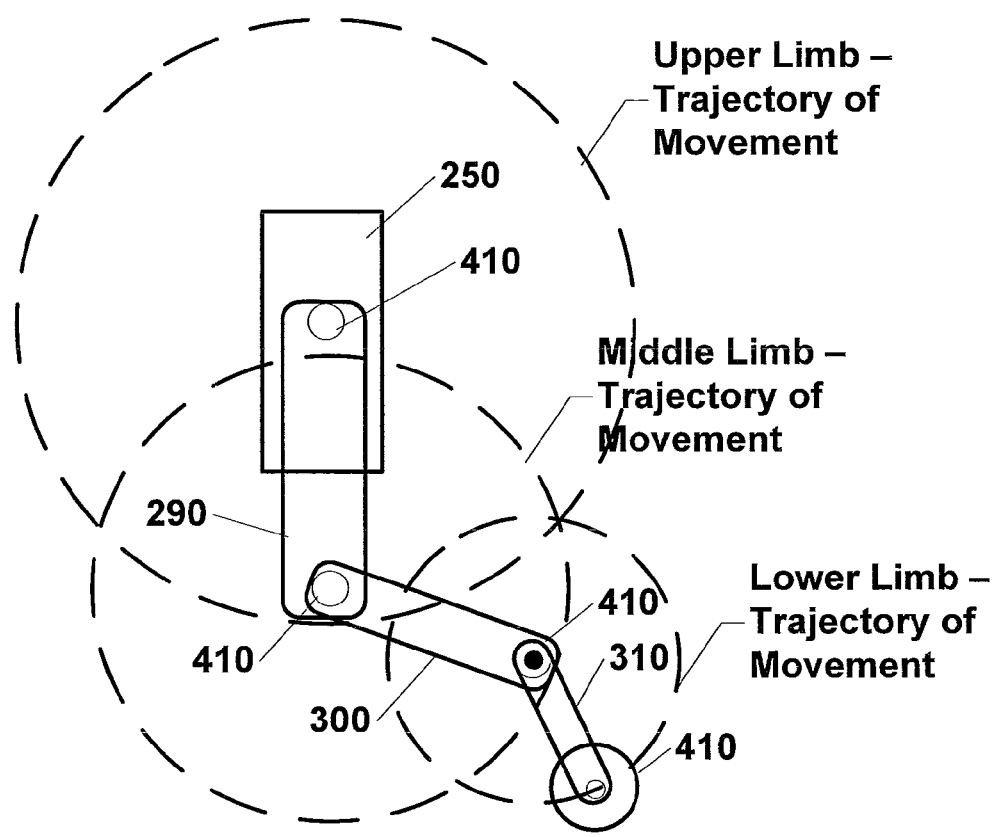
Figure 9:
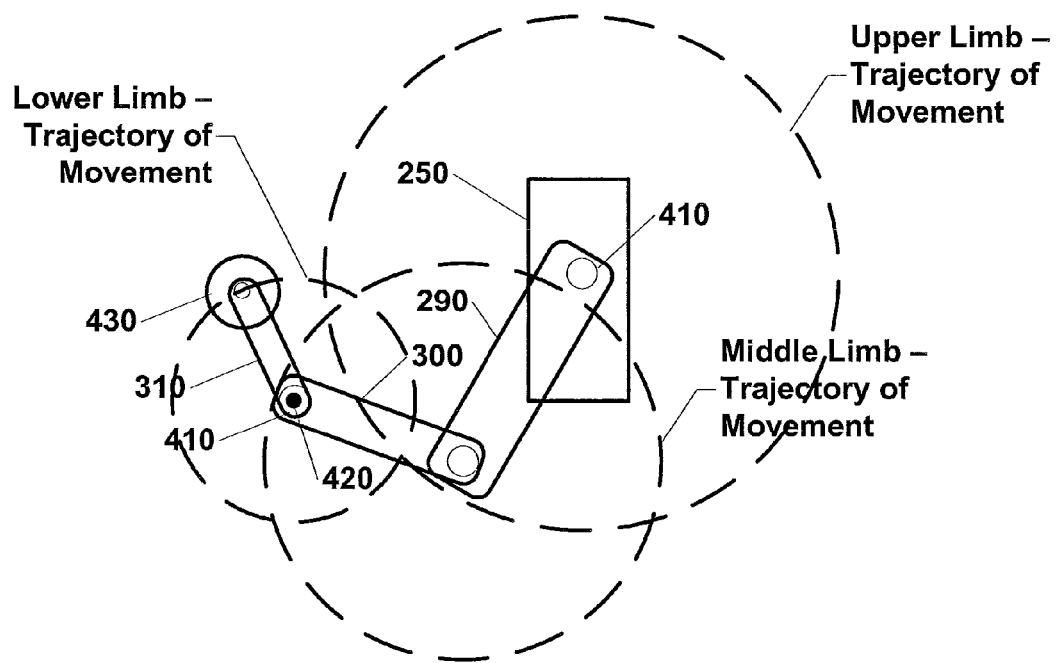
Figure 10:
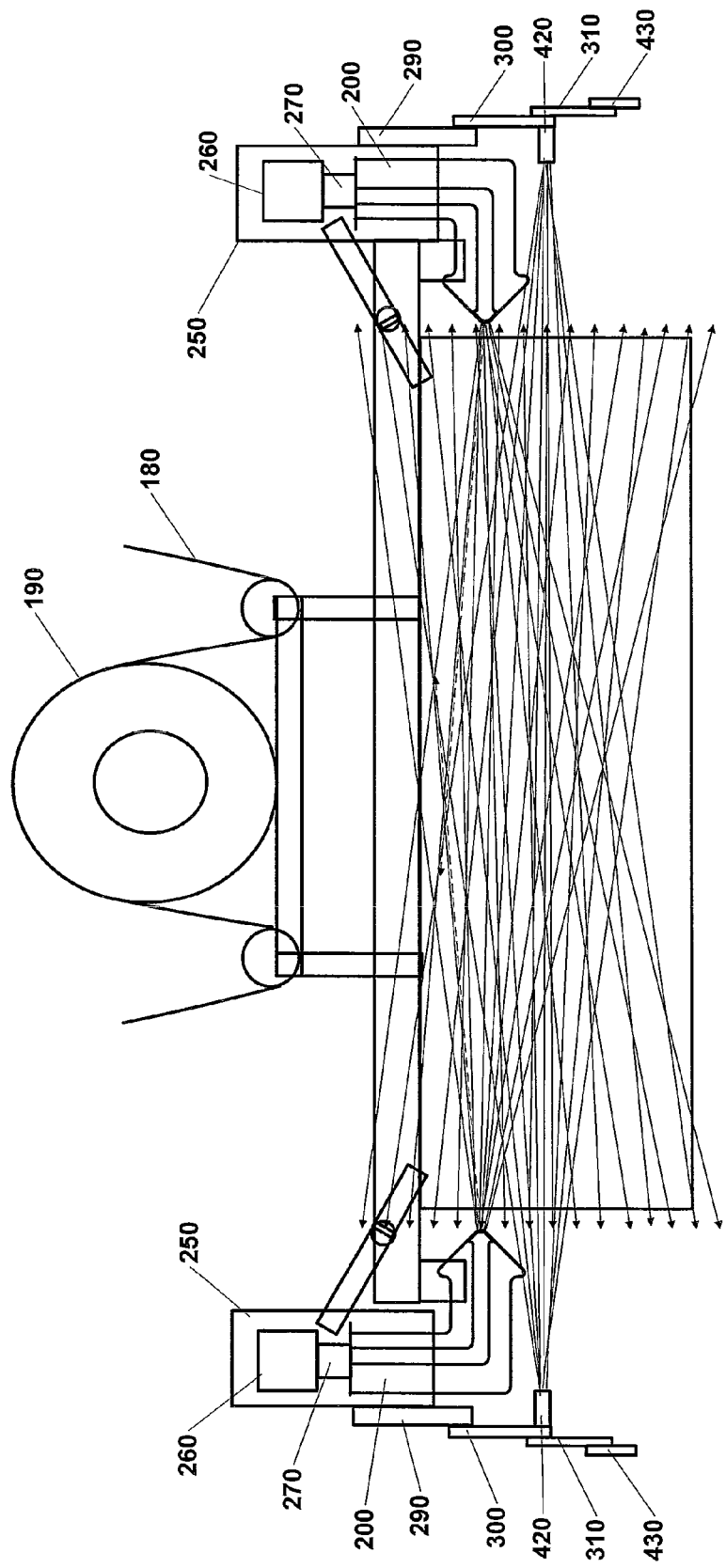
FIG. 10 is a side view of the crane system of FIG. 1 adapted for use with the contraband detection system deployed in an active position.

With reference to FIGS. 5 and 6, and with continuing reference to FIG. 4, detection apparatus 210 is shown in a retracted position in FIG. 5 and a fully extended position in FIG. 6. In a retracted position, middle limb 300 is rotated about second axis 360 such that first end 340 of middle limb 300 is aligned with first end 320 of upper limb 290. Similarly, lower limb 310 is rotated about third axis 390 such that second end 400 of lower limb 310 is aligned with first end 340 of middle limb 300. In such configuration, detection apparatus 210 is retracted to a compact storage position in order to facilitate engagement of spreader beam 160 to and from cargo container 170. As shown in FIG. 6, in a fully extended position, middle limb 300 is rotated about second axis 360 such that first end 340 of middle limb 300 is aligned opposite from first end 320 of upper limb 290. Similarly, lower limb 310 is rotated about third axis 390 such that second end 400 of lower limb 310 is aligned opposite from first end 340 of middle limb 300. In such configuration, detection apparatus 210 is extended to its maximum length. FIGS. 7-9 illustrate various limb orientations of detection apparatus 210.

Each detection apparatus 210 is dimensioned such that in its fully extended state detection apparatus 210 can scan the entire side of cargo container 170. Each limb of detection apparatus 210 is driven by its respective stepper motor 410 capable of rotating each limb through a full 360 degrees of rotation. One of ordinary skill in the art will understand that various other embodiments of detection apparatus 210 are possible without departing from the intended scope of the invention. An alternate structure, such as a robotic arm (not shown) may be utilized to move across the entire side of cargo container 170 located proximate to longitudinal ends of spreader beam 160. While various other designs are contemplated, each design is engineered with a purpose of extending along the entire side of cargo container 170.

With continuing reference to FIGS. 4-9, detection apparatus 210 includes a radiation source 420 disposed on second end 380 of middle limb 300. Radiation source 420 may be an X-ray, gamma ray, or proton beam source capable of outputting medium intensity radiation rays. In one desirable embodiment, radiation source 420 may utilize a gamma ray isotope, such as cobalt 60. Second end 400 of lower limb 310 includes a receptor plate 430 coated with imaging material that corresponds to the type of radiation source 420 utilized. For example, receptor plate 430 may be coated with X-ray imaging material in an embodiment where radiation source 420 is an X-ray emitter. Similarly, receptor plate 430 may be coated with gamma ray imaging material in an embodiment where radiation source 420 is a gamma ray emitter. Receptor plate 430 is used to capture radiation emitted from radiation source 420 of an opposing detection apparatus 210. The beam emitted by radiation source 420 may be collimated through an adjustable optic lens (not shown) in order to match the circular or other geometrically-shaped area of the beam with the area of a similarly shaped receptor plate 430. This allows for use of detection apparatus 210 with cargo containers 170 having various lengths without making physical/manual adjustments to detection apparatus 210.

Figure 11:
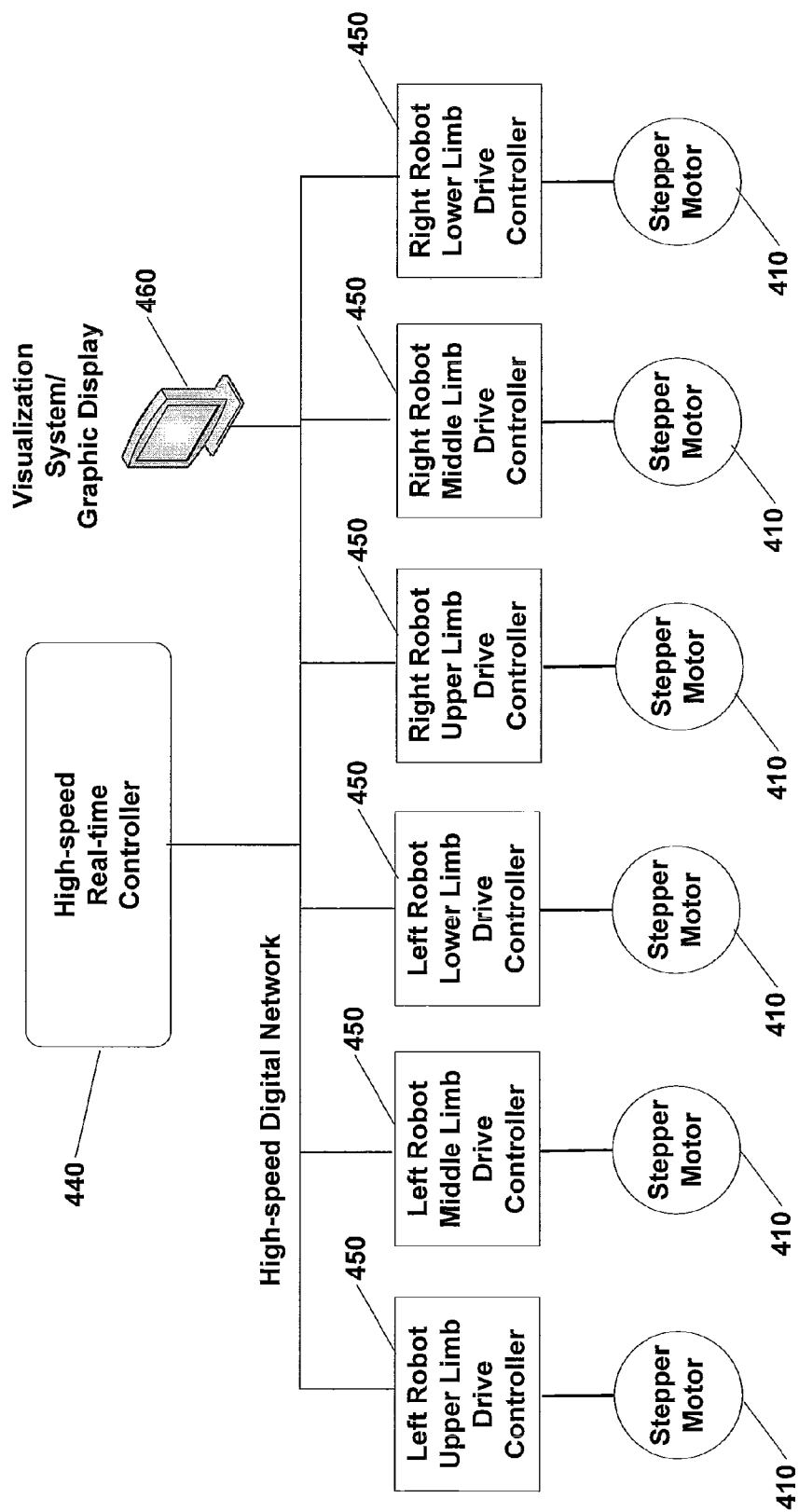
FIG. 11 is a schematic diagram of a control system for controlling the operation of the detection apparatus.

With reference to FIG. 11, each detection apparatus 210 is controlled by a controller 440 operatively connected to each of stepper motors 410 for limbs 290, 300, and 310. Controller 440 synchronizes the motion of each detection apparatus 210 such that each limb of each detection apparatus 210 is oriented in a position that corresponds to the position of each limb on an opposing detection apparatus 210. For example, controller 440 may control the speed and angular position of each stepper motor 410 through respective drive controllers 450 to keep limbs of opposing detection apparatus 210 aligned. A display system 460 relates the status and position of each detection apparatus 210 to an operator. Controller 440 may be operated through a wireless connection. Controller 440 may also be utilized to control operation of X-ray scanner 200, including the operation of motor 260 and gear mechanism 270.

Figure 12:
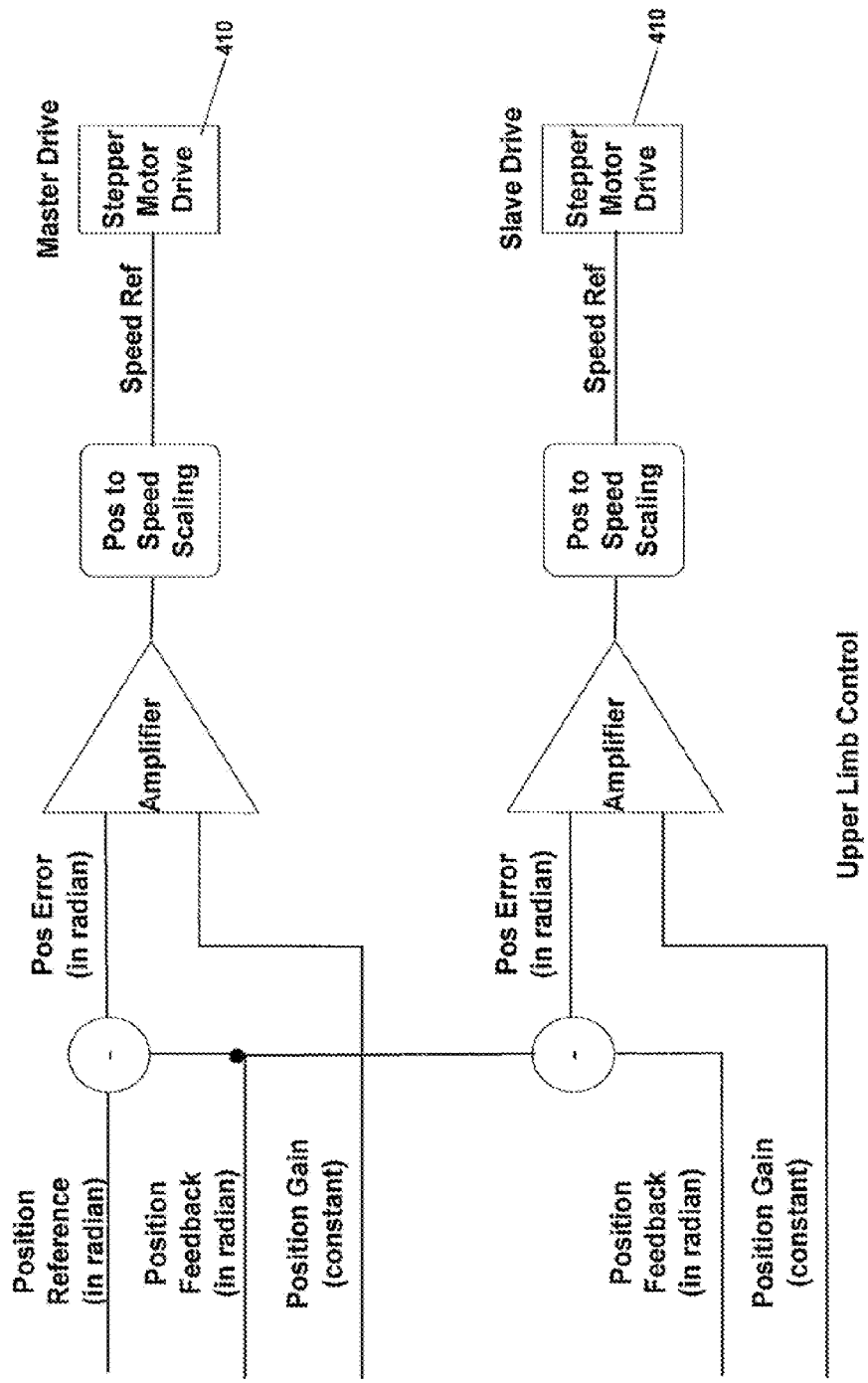
FIGS. 12-14 are schematic diagrams of a control system for controlling the synchronization of various limbs of detection apparatus.
Figure 13:
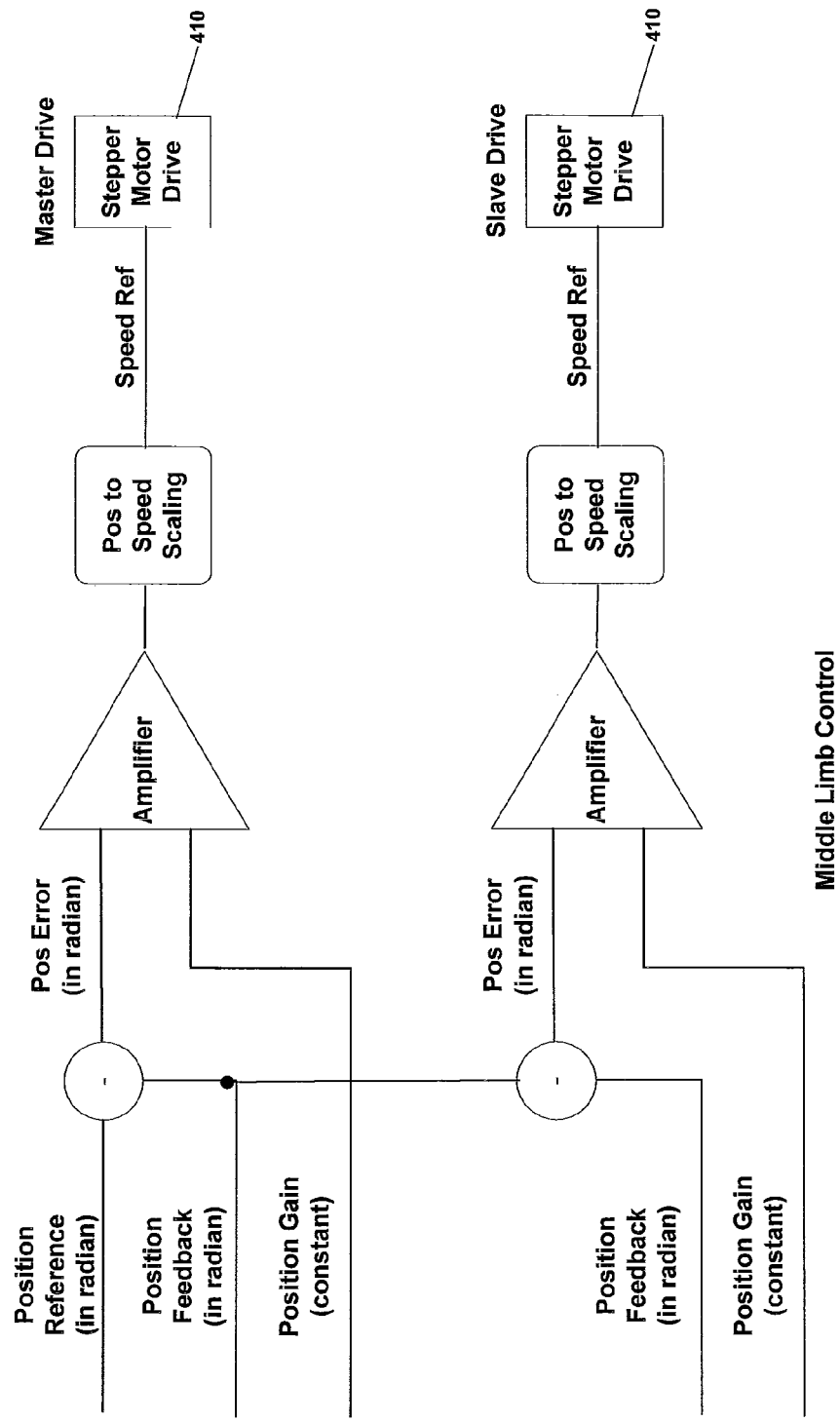
Figure 14:
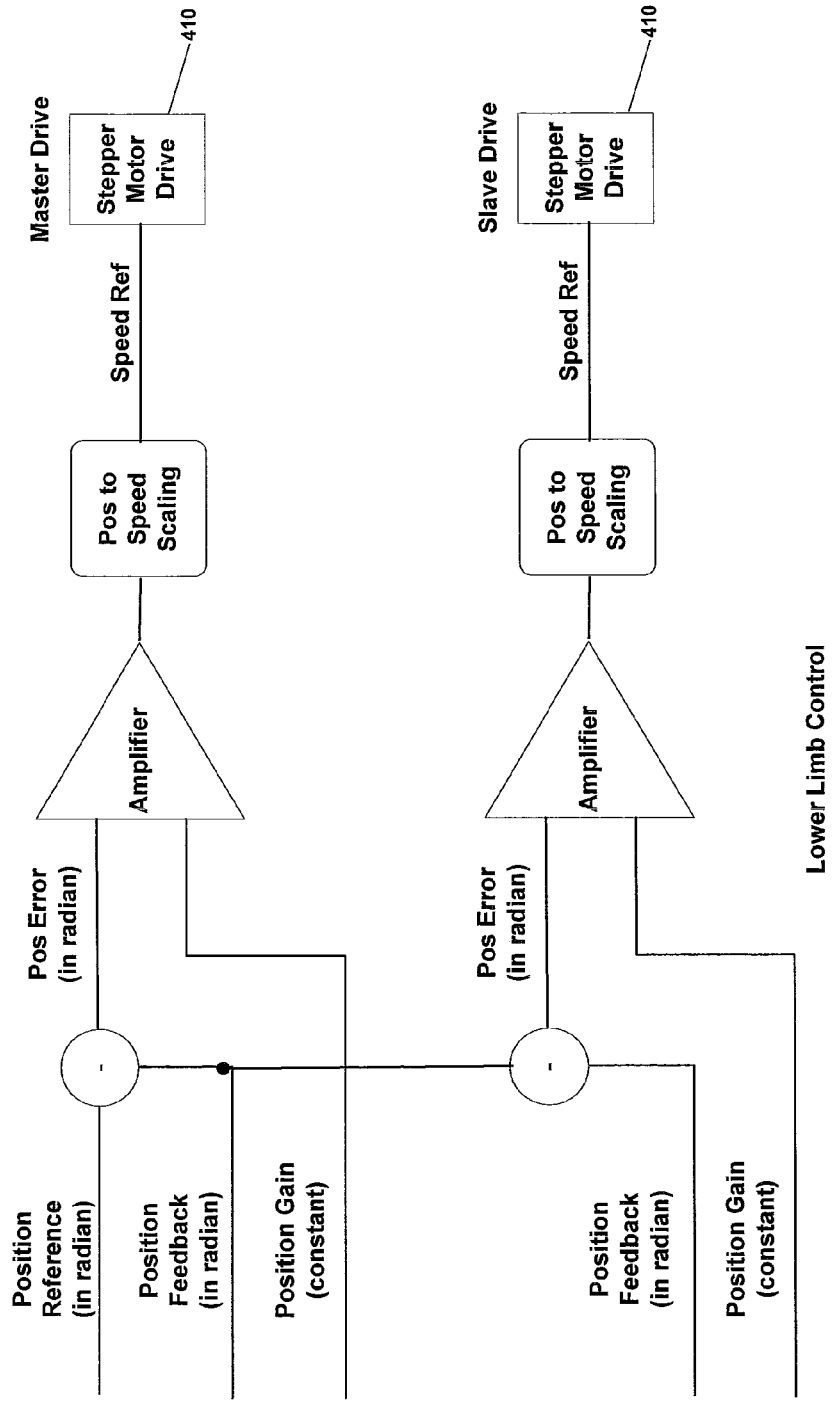

The position of each limb of each detection apparatus 210 can be synchronized in accordance with block diagrams shown in FIGS. 12-14. Detection apparatus 210 are controlled on a master/slave principle, where one of detection apparatus 210 is a master and the other detection apparatus 210 is a slave. FIG. 12 illustrates a control system for upper limb 290 synchronization. Position reference and feedback expressed in radial or linear coordinates for upper limb 290 are input and scaled to give an appropriate speed reference signal which is used to drive stepper motor 410 of upper limb 290 of the master detection apparatus 210. This information is used to generate a corresponding signal which produces an appropriate speed reference signal which is used to drive stepper motor 410 of upper limb 290 of the slave detection apparatus 210. Similarly, as shown in FIGS. 13 and 14, position reference and feedback expressed in radial or linear coordinates for middle limb 300 and lower limb 310 are input and scaled to give an appropriate speed reference signal which is used to drive stepper motors 410 of middle limb 300 and lower limb 310. This information is used in turn to generate a corresponding signal which produces an appropriate speed reference signal which is used to drive stepper motors 410 of middle limb 300 and lower limb 310 of the slave detection apparatus 210.

In operation, detection apparatus 210 take a snapshot radiographic image of only a small portion of cargo container 170 at any given time. A plurality of radiographic images is taken at a plurality of positions along the side of cargo container 170. Data gathered from these images is combined and processed to generate a single radiographic image of the entire cargo container 170.

Figure 15:
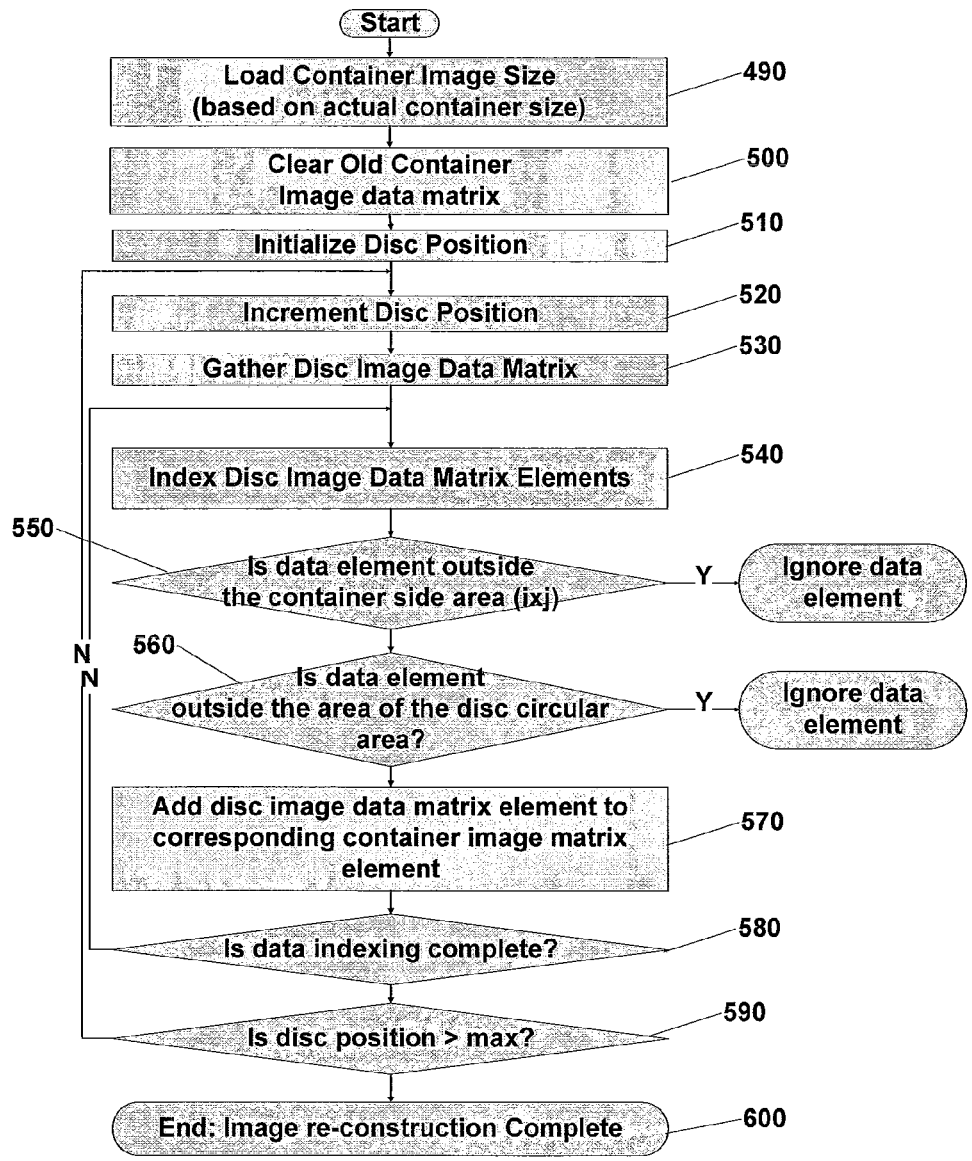
FIG. 15 is a flow chart for generating a single radiographic image of a cargo container from a plurality of radiographic images of portions of the cargo container.
Figure 16:
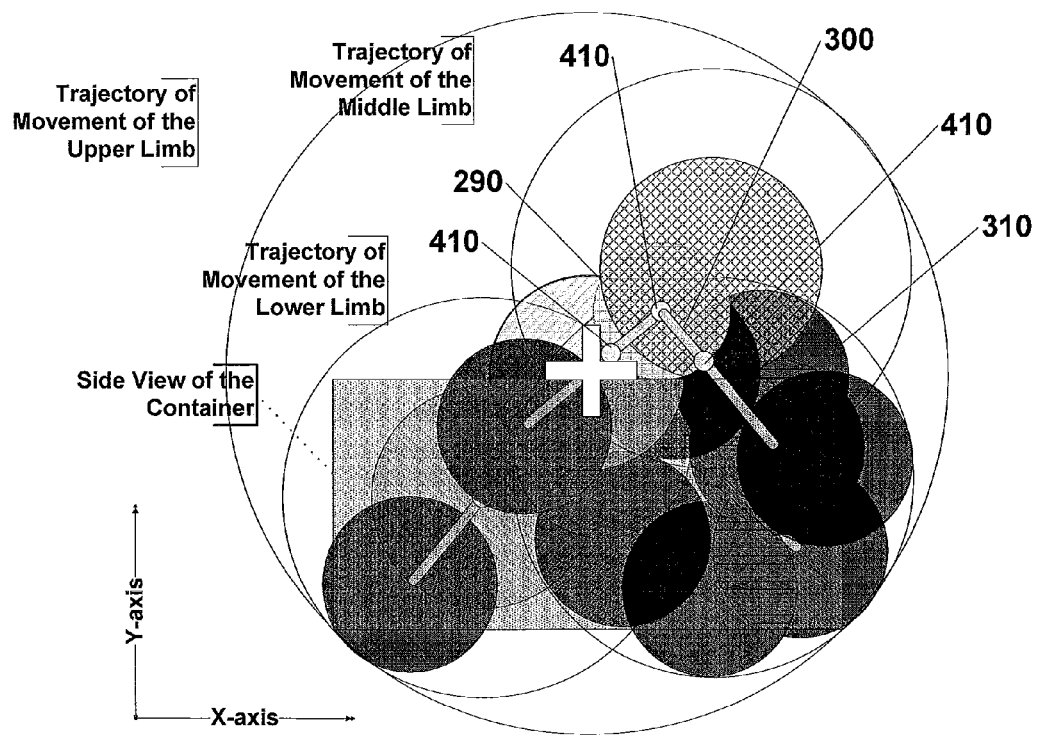
FIG. 16 is an illustration of multiple radiographic images of portions of the cargo container forming a partial single radiographic image of the cargo container.

With reference to FIG. 15, a flow chart for generating a single radiographic image of the entire cargo container 170 from multiple images of portions of cargo container 170 starts at step 490 where an operator loads information regarding the size of cargo container 170. At step 500, information from a previously screened cargo container 170 is erased. Next, at step 510, each detection apparatus 210 is initialized and placed to a first increment position at step 520. Radiation from radiation source 420 on one detection apparatus 210 is detected by receptor plate 430 on opposing detection apparatus 210 to generate an image data matrix at step 530. The position of each detection apparatus 210 is incremented until image data matrices for the entire cargo container 170 are gathered. Each image data matrix is indexed at step 540. At steps 550 and 560, each image data matrix is compared to determine whether data from that matrix fall outside the physical dimensions of cargo container 170 or the physical dimension of receptor plate 430, respectively. At step 570, multiple image data matrices are added together to complete a single image of entire cargo container 170. Multiple radiographic images from detection apparatus 210 are shown in FIG. 16, which illustrates a partial radiographic image of a side of cargo container 170. At step 580, an inquiry of whether data indexing is complete is taken. If data indexing is complete in step 580, the image reconstruction process advances to step 590 where an inquiry about the position of receptor plate 430 is taken. If data indexing is not complete at step 580, the image reconstruction process reverts to gathering additional image data matrices at step 530. At step 590, if the position of receptor plate 430 is at its full extension, the image reconstruction process is complete and it terminates at step 600. Conversely, if the position of receptor plate 430 is not at its full extension at step 590, the image reconstruction process reverts to step 520 to increment the position of detection apparatus 210.

X-ray/gamma ray/proton beams generated by radiation source 420 pass through the content of cargo container 170 and are captured by receptor plate 430 mounted on lower limb 310 of the opposing detection apparatus 210. Every type of material (radioactive or not) absorbs certain kinds of rays (frequency and wavelength) and lets other portions of rays/waveform pass through it without distortion. By comparing the waveform of the source waveform generated by radiation source 420 with the captured waveform received by receptor plate 430, a unique "signature" of the material that the rays passed through is obtained. The captured waveform is analyzed by comparing the detected signature with known signatures to determine the nature of the material that is contained in the container. A data analysis computer 700 may be used to perform the analysis of the signals produced by receptor plates 430.

Referring back to FIG. 4, sensor array 220 is provided for screening each cargo container 170 for the presence of contraband materials. Sensor array 220 desirably includes a plurality of sensors for detecting contraband materials. For example, sensor array 220 may include a non-contact explosive detector capable of detecting the presence of explosives. Additionally, sensor array 220 may include a biological hazard material detector capable of detecting a variety of biological hazards, including bacteria, viruses, etc. Furthermore, sensor array 220 may include a chemical detector capable of detecting a variety of chemically-toxic materials, including toxic and/or nerve gases. In addition, sensor array 220 may include a radiation detector, such as a Geiger counter, capable of detecting a variety of nuclear radiation sources. One of ordinary skill in the art will understand that a plurality of detectors may be utilized within sensor array 220 without departing from the intended scope of the invention.

Figure 17:
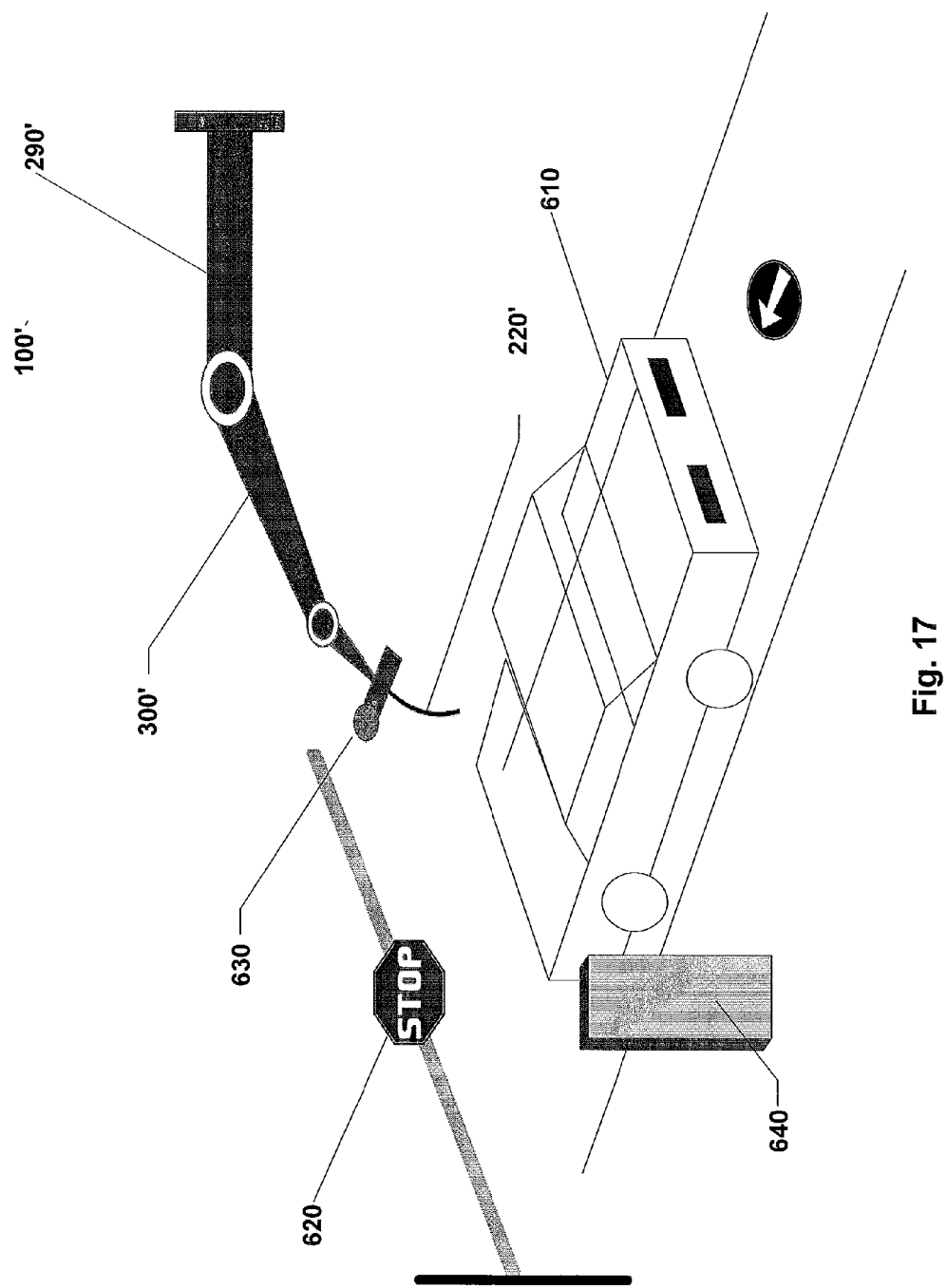
FIG. 17 is a perspective image of an alternate embodiment of the contraband detection system shown in use at a vehicle security checkpoint.

With reference to FIG. 17, a second embodiment of contraband detection system 100' is illustrated for use in screening vehicles. A vehicle 610 stopped at a checkpoint 620 is screened using contraband detection system 100' to detect the presence of contraband materials. In FIG. 17, contraband detection system 100' is illustrated as being mounted to a wall; however, one of ordinary skill in the art will understand that other alternate mounting locations for contraband detection system 100' are also possible. Contraband detection system 100' includes a plurality of rotatable articulating limbs, 290', 300', and 310'. A camera 630 is attached to a distal end of limb 310'. Camera 630 records the vehicle shape and other information, such as a driver image/photo/video and/or vehicle license plate image/photo, and sends this information to a controller 640. Controller 640 processes data received from camera 630 and generates instructions for the movement of the limbs of contraband detection system 100' such that the entire vehicle 610 is scanned. A sensor array 220' is provided on contraband detection system 100' to detect the presence of various contraband materials, such as explosives, chemicals, narcotics, etc.

Figure 18:
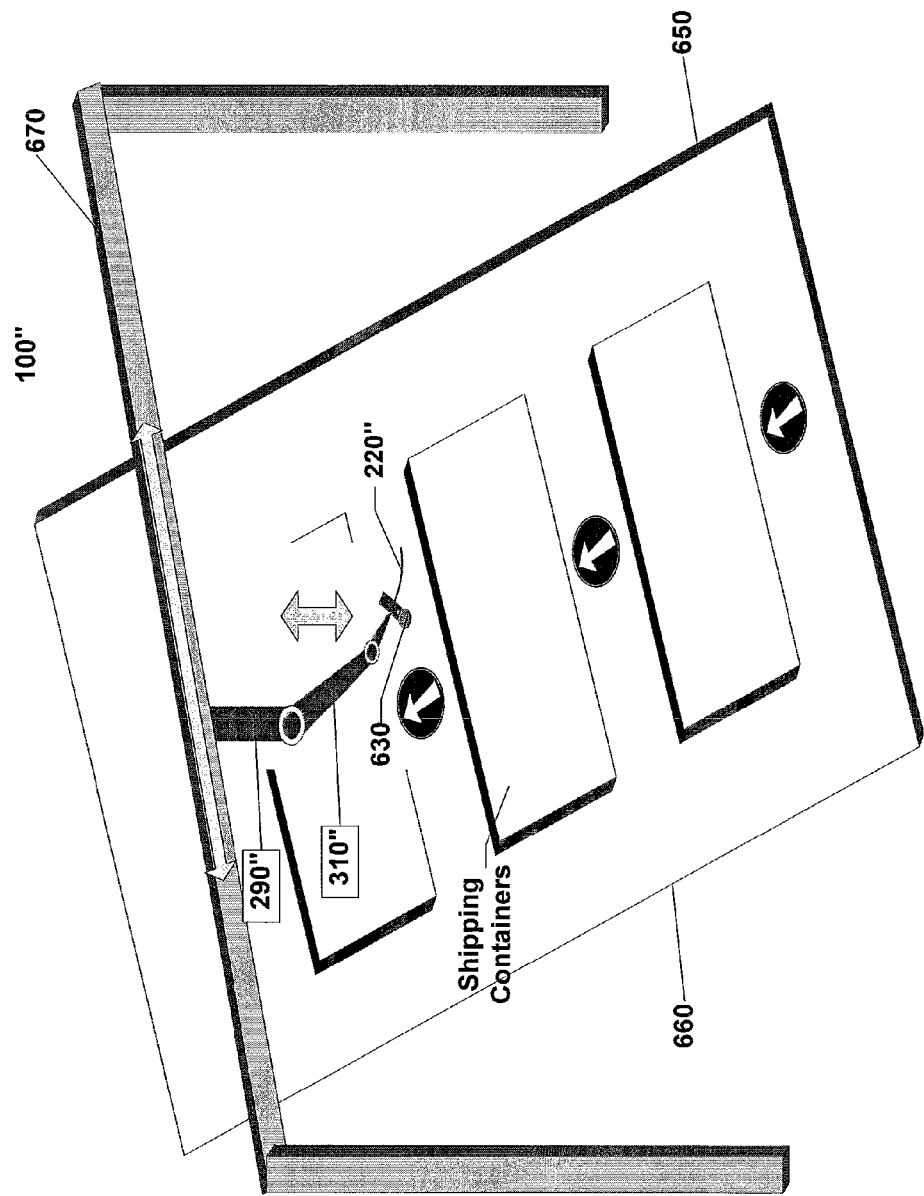
FIG. 18 is a perspective image of a further embodiment of the contraband detection system shown in use with a moving conveyer for inspection of containers.

FIG. 18 illustrates a further embodiment of contraband detection system 100 for use in screening containers 650 moving on a conveyor belt 660. Contraband detection system 100" in FIG. 18 is illustrated as being mounted to an overhead beam 670; however, one of ordinary skill in the art will understand that other alternate mounting locations for contraband detection system 100" are also possible. Contraband detection system 100" includes a plurality of rotatable articulating limbs, 290", 300", and 310" capable of articulating to a plurality of positions surrounding each container 650. A camera 630 is attached to a distal end of limb 310'. Camera 630 records the container shape and sends this information to a controller 640. Controller 640 processes data received from camera 630 and generates instructions for the movement of the limbs of contraband detection system 100' such that entire container 650 is scanned. A sensor array 220' is provided on contraband detection system 100' to detect the presence of various contraband materials, such as explosives, chemicals, narcotics, etc.

With the structure of contraband detection system 100 now described, a method of operation will be described hereafter with reference to an embodiment wherein contraband detection system 100 is utilized on crane system 110. The screening process for detecting contraband materials in a shipyard setting desirably occurs during the time when cargo containers 170 are transported using crane system 110. For example, the screening process may occur during the time cargo container 170 is transported from one location at a shipyard to another location at a shipyard and/or during the time cargo container 170 is transported from a ship to shipyard (or vice versa).

Figure 19:
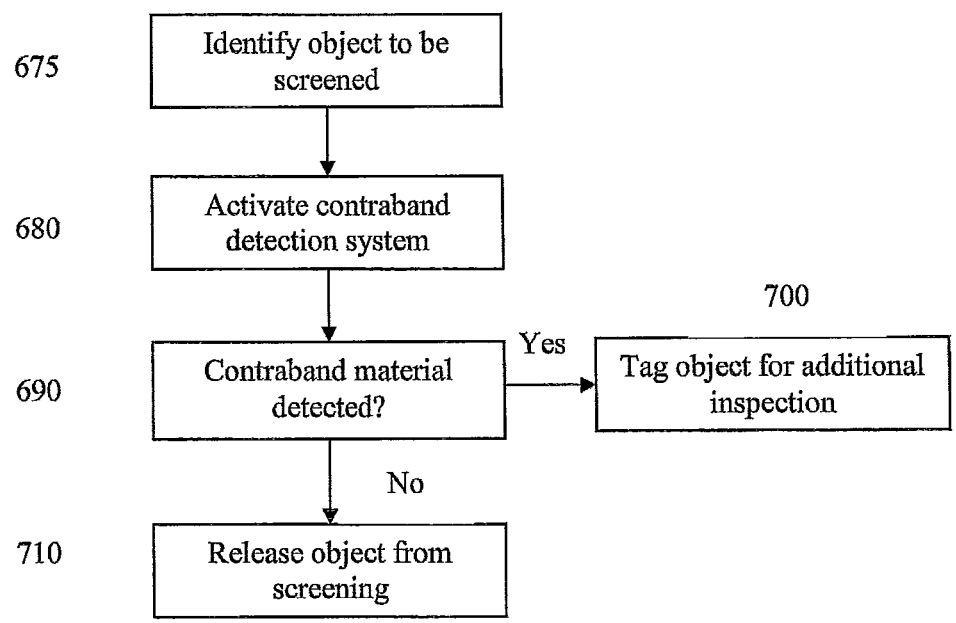
FIG. 19 is a flow chart of a method for detecting contraband materials.

With reference to FIG. 19, the method for detecting contraband materials begins at step 675 where an object to be screened is identified. In the particular embodiment described herein, the operator of crane system 110 identifies cargo container 170 to be moved from one location to another. Using trolley 130 to move spreader beam 160, the operator positions spreader beam 160 over cargo container 170 such that the attachment means securely engage cargo container 170. Cargo container 170 is then lifted and moved to a different location. Typically, it takes approximately 30 s to 180 s to move cargo container 170 from one location to another, which is a sufficient amount of time to screen cargo container 170 for the presence of any contraband materials using contraband detection system 100.

Once the object to be screened is identified at step 675, contraband detection system 100 is activated at step 680. In the particular embodiment described herein, one or both X-ray scanners 200 located on opposing longitudinal ends of spreader beam 160 are engaged from an inactive first position 230 to an active second position 240. As described above, X-ray scanners 200 may be engaged to second position 240 by activating motor 260 to drive gear mechanism 270 to deploy X-ray scanners to second position 240. Additionally, vertical adjustment mechanism 280 may be activated to adjust the vertical position of X-ray scanner 200 with respect to cargo container 170. Once X-ray scanner 200 is deployed to second position 240, it may be powered on to scan the contents of cargo container 170 for the presence of contraband materials. Similarly, detection apparatus 210 is moved from an inactive first position 230 to an active second position 240. Once detection apparatus 210 is deployed to second position 240, it may be powered on to scan the contents of cargo container 170 for the presence of contraband materials. Additionally, sensor array 220 is initialized for screening the contents of cargo container 170 for the presence of contraband materials.

Once contraband detection system 100 is activated at step 680, the object is screened for the presence of contraband materials at step 690. In the particular embodiment described herein, X-ray scanners 200 emit X-ray radiation to penetrate the structure of cargo container 170. Similarly, detection apparatus 210 is activated to scan cargo container 170 for the presence of contraband materials. An exemplary method by which detection apparatus 210 scans cargo container 170 is described above in connection with FIG. 15. Sensor array 220 also scans cargo container 170.

During the scanning process, if any of the detection devices of contraband detection system 100 detect the presence of contraband materials, such as radioactive or nuclear material, explosives, chemicals, and/or narcotics, the method of detecting contraband materials advances to step 700 where the object is tagged for additional inspection. In this step, for example, cargo container 170 may be moved to a safe location where a closer inspection of its contents may be performed. Conversely, if none of the detection devices of contraband detection system 100 detects the presence of contraband materials, the method advances to step 710, wherein the screened object is released from the scanning process. In the particular embodiment described herein, the operator of crane system 110 delivers cargo container 170 to a new location and disengages spreader beam 160 from cargo container 170. The method may be repeated by identifying a second cargo container 170 and repeating steps 675-710 described above.

As illustrated above, contraband detection system 100 of the present invention may be utilized in a variety of applications to detect the presence of contraband materials stored inside objects, such as vehicles, luggage, and/or cargo containers. While the device and method of the present invention have been described with respect to preferred embodiments, various modifications and alterations of the present invention may be made without departing from the spirit and scope of the present invention. Those skilled in the art may now make numerous uses of, changes to, or departures from the herein above described embodiments without departing from the inventive principles discussed herein. Although a crane-mountable method and apparatus for non-destructive testing of objects for contraband materials has been used by way of an example, the method and device of the present invention are equally applicable to a number of other embodiments. The scope of the present invention is defined in the appended claims and equivalents thereto.

The invention claimed is:

1. A contraband detection system for screening an object for the presence of contraband materials, the contraband detection system comprising:
   a first detection apparatus having a first X-ray radiation source and a first X-ray radiation detector;
   a second detection apparatus having a second X-ray radiation source and a second X-ray radiation detector, the second detection apparatus disposed opposite the first detection apparatus such that the object to be screened for the presence of contraband materials is located between the first detection apparatus and the second detection apparatus;
   a controller for operating the first detection apparatus and the second detection apparatus; and
   a data analysis computer operative for receiving signals from the first detection apparatus and the second detection apparatus,
   wherein the first X-ray radiation source emits a first X-ray radiation beam that is received by the second X-ray radiation detector after passing through the object to generate a first signal commensurate with X-ray radiation detected by the second X-ray radiation detector and the second X-ray radiation source emits a second X-ray radiation beam that is received by the first X-ray radiation detector after passing through the object to generate a second signal commensurate with X-ray radiation detected by the first X-ray radiation detector, and
   wherein the data analysis computer receives the first signal and the second signal and analyzes the signals to determine whether the object contains contraband materials, and wherein each of the first detection apparatus and the second detection apparatus further comprises a plurality of limbs operative for rotating about a plurality of rotation axes, wherein the plurality of limbs is capable of being articulated to a plurality of positions about the object to screen the object for the presence of contraband materials.

2. The contraband detection system according to claim 1, wherein the plurality of limbs is capable of being articulated to a first, fully-retracted position, a second, fully-extended position, and a plurality of intermediate positions between the first position and the second position.

3. The contraband detection system according to claim 1, wherein the controller synchronizes the operation of the plurality of limbs of the first detection apparatus and the plurality of limbs of the second detection apparatus, wherein one of the first detection apparatus or the second detection apparatus is a master and the other of the first detection apparatus or the second detection apparatus is a slave.

4. The contraband detection system according to claim 1, further comprising an X-ray scanner deployable between a first, inactive position and a second, active position.

5. The contraband detection system according to claim 1, further comprising a sensor array having a plurality of sensors for detecting contraband materials.

6. A contraband detection system for detecting the presence of contraband materials in a cargo container hoisted by a crane system, the contraband detection system comprising:
a crane system having a spreader beam operative for engaging the cargo container and hoisting the cargo container from a first location to a second location;
a first detection apparatus located on one end of the spreader beam and/or the head block of the crane system, the first X-ray detection apparatus having a first X-ray radiation source and a first X-ray radiation detector;
a second detection apparatus located on an opposing end of the spreader beam and/or the head block of the crane system, the second detection apparatus having a second X-ray radiation source and a second X-ray radiation detector, the second detection apparatus disposed opposite the first detection apparatus such that the cargo container to be screened for the presence of contraband materials is located between the first detection apparatus and the second detection apparatus;
a controller for operating the first detection apparatus and the second detection apparatus; and
a data analysis computer operative for receiving signals from the first detection apparatus and the second detection apparatus,
wherein the first X-ray radiation source emits a first X-ray radiation beam that is received by the second X-ray radiation detector after passing through the cargo container to generate a first signal commensurate with X-ray radiation detected by the second X-ray radiation detector and the second X-ray radiation source emits a second X-ray radiation beam that is received by the first X-ray radiation detector after passing through the cargo container to generate a second signal commensurate with X-ray radiation detected by the first X-ray radiation detector, and wherein the data analysis computer receives the first signal and the second signal and analyzes the signals to determine whether the cargo container contains contraband materials.

7. The contraband detection system according to claim 6, wherein each of the first detection apparatus and the second detection apparatus further comprises a plurality of limbs operative for rotating about a plurality of rotation axes, wherein the plurality of limbs is capable of being articulated to a plurality of positions adjacent to a side of the cargo container to screen the cargo container for the presence of contraband materials.

8. The contraband detection system according to claim 6, wherein each of the first detection apparatus and the second detection apparatus further comprises:
an upper limb rotatable about its first end with respect to the spreader beam, the upper limb being rotatable about a first axis;
a middle limb having its first end coupled to a second end of the upper limb, the middle limb being rotatable about a second axis; and
a lower limb having its first end coupled to a second end of the middle limb, the lower limb being rotatable about a third axis,
wherein the limbs are operative for articulating to a first position to facilitate engagement of the spreader beam to the cargo container and a second position for screening the cargo container once the spreader beam is engaged to the cargo container, and wherein in the second position the limbs are capable of being articulated to a plurality of positions adjacent to a side of the cargo container to screen the cargo container for the presence of contraband materials.

9. The contraband detection system according to claim 8, wherein the controller synchronizes the operation of the limbs of the first detection apparatus and the limbs of the second detection apparatus such that one of the first detection apparatus or the second detection apparatus is a master and the other of the first detection apparatus or the second detection apparatus is a slave.

10. The contraband detection system according to claim 8, wherein the first and second X-ray radiation sources are disposed on the middle limbs of the first and second X-ray detection apparatus, respectively, and the first and second X-ray radiation detectors are disposed on the lower limbs of the first and second X-ray detection apparatus, respectively.

11. The contraband detection system according to claim 8, wherein each of the limbs is rotatable about its respective axis by a stepper motor controlled by the controller.

12. The contraband detection system according to claim 6, further comprising an X-ray scanner deployable between a first, inactive position and a second, active position.

13. The contraband detection system according to claim 6, further comprising a sensor array having a plurality of sensors for detecting contraband materials.

14. A method for detecting contraband materials, the method comprising the steps of:
providing a crane system having a spreader beam operative for engaging a cargo container and hoisting the cargo container from a first location to a second location;
providing a contraband detection system on the crane system for detecting the presence of contraband materials in the cargo container, the contraband detection system having a first detection apparatus and a second detection apparatus;
locating the first detection apparatus on one end of the spreader beam, the first detection apparatus having a first X-ray radiation source and a first X-ray radiation detector;
locating the second detection apparatus on an opposing end of the spreader beam, the second detection apparatus having a second X-ray radiation source and a second X-ray radiation detector, the second detection apparatus disposed opposite the first detection apparatus such that the cargo container to be screened for the presence of contraband materials is located between the first detection apparatus and the second detection apparatus;

identifying the cargo container to be screened for the presence of contraband materials;

controlling the operation of the first detection apparatus and the second detection apparatus to screen the cargo container;

receiving signals generated by the first detection apparatus and the second detection apparatus; and analyzing the received signals to determine whether the cargo container contains contraband materials.

15. The method of claim 14, wherein the first X-ray radiation source emits a first X-ray radiation beam that is received by the second X-ray radiation detector after passing through the cargo container to generate a first signal commensurate with X-ray radiation detected by the second X-ray radiation detector and the second X-ray radiation source emits a second X-ray radiation beam that is received by the first X-ray radiation detector after passing through the cargo container to generate a second signal commensurate with X-ray radiation detected by the first X-ray radiation detector, and wherein a data analysis computer receives the first signal and the second signal and analyzes the signals to determine whether the cargo container contains contraband materials.

16. The method of claim 14, further comprising the step of generating a single radiographic image of the cargo container compiled from multiple radiographic images of portions of the cargo container obtained from signals generated by the first detection apparatus and the second detection apparatus, wherein the single radiographic image is indicative of whether the cargo container contains contraband materials.

17. The method of claim 14, wherein each of the first detection apparatus and the second detection apparatus further comprises a plurality of limbs operative for rotating about a plurality of rotation axes, wherein the plurality of limbs is capable of being articulated to a plurality of positions adjacent to a side of the cargo container to screen the cargo container for the presence of contraband materials.

18. The method of claim 17, wherein a controller synchronizes the operation of the limbs of the first detection apparatus and the limbs of the second detection apparatus such that one of the first detection apparatus or the second detection apparatus is a master and the other of the first detection apparatus or the second detection apparatus is a slave.

19. The method of claim 17, wherein the contraband detection system further comprises an X-ray scanner deployable between a first, inactive position and a second, active position.

* * * * *